(12) United States Patent
Li

(10) Patent No.: US 12,425,316 B2
(45) Date of Patent: Sep. 23, 2025

(54) DATA PROCESSING METHOD AND APPARATUS

(71) Applicant: HUAWEI TECHNOLOGIES CO., LTD., Guangdong (CN)

(72) Inventor: Zhuoming Li, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/549,239

(22) Filed: Dec. 13, 2021

(65) Prior Publication Data

US 2022/0103435 A1 Mar. 31, 2022

Related U.S. Application Data

(63) Continuation of application No. PCT/CN2020/096391, filed on Jun. 16, 2020.

(30) Foreign Application Priority Data

Jun. 17, 2019 (CN) .......................... 201910522986.1

(51) Int. Cl.
H04L 43/065 (2022.01)
H04L 41/14 (2022.01)
(Continued)

(52) U.S. Cl.
CPC ............ *H04L 43/065* (2013.01); *H04L 41/14* (2013.01); *H04L 41/40* (2022.05);
(Continued)

(58) Field of Classification Search
CPC ..... H04L 41/5009; H04L 43/04; H04L 43/06; H04L 43/0882; H04L 41/14; H04L 41/40;
(Continued)

(56) References Cited

U.S. PATENT DOCUMENTS 10,764,175 B1* 9/2020 Filsfils .................... H04L 45/20
2018/0206152 A1* 7/2018 Zhang ..................... H04W 4/24
(Continued)

FOREIGN PATENT DOCUMENTS

CN 109417572 A 3/2019
CN 109511136 A 3/2019
(Continued)

OTHER PUBLICATIONS

3GPP TS 23.503 V15.0.0 (Dec. 2017),3rd Generation Partnership Project;Technical Specification Group Services and System Aspects;Policy and Charging Control Framework for the 5G System;Stage 2(Release 15),total 56 pages.
(Continued)

*Primary Examiner* — Joe Chacko

(57) ABSTRACT

This application provides a data processing method and apparatus, and relates to the field of communications technologies. The method is implemented by a data analysis network element and includes receiving an analysis request from a requester, and after receiving the analysis request, obtaining load data of a target network element based on the analysis request. The method further includes generating an analysis result of the target network element based on the obtained load data, and sending the analysis result to the requester. The analysis request includes information about the target network element, and the load data includes service load information.

20 Claims, 11 Drawing Sheets

(51) Int. Cl.
    *H04L 41/40*     (2022.01)
    *H04L 41/5009*     (2022.01)
    *H04L 43/04*     (2022.01)
    *H04L 43/06*     (2022.01)
    *H04L 43/0882*     (2022.01)
    *H04L 43/20*     (2022.01)
    *H04W 28/02*     (2009.01)

(52) U.S. Cl.
    CPC .......... *H04L 41/5009* (2013.01); *H04L 43/04* (2013.01); *H04L 43/06* (2013.01); *H04L 43/0882* (2013.01); *H04L 43/20* (2022.05); *H04W 28/0284* (2013.01)

(58) Field of Classification Search
    CPC ....... H04L 43/20; H04L 43/065; H04L 43/55; H04W 28/0284; H04W 24/04; H04W 24/08; H04W 24/00
    See application file for complete search history.

(56) References Cited

U.S. PATENT DOCUMENTS

| | | | | |
|---|---|---|---|---|
| 2019/0222489 | A1* | 7/2019 | Shan | H04M 15/8022 |
| 2020/0275359 | A1* | 8/2020 | Bordeleau | H04L 41/0806 |
| 2021/0204198 | A1* | 7/2021 | Xin | H04L 41/342 |
| 2022/0046101 | A1* | 2/2022 | Zhang | H04L 67/51 |
| 2022/0321418 | A1* | 10/2022 | Xu | H04W 72/04 |

FOREIGN PATENT DOCUMENTS

| | | |
|---|---|---|
| CN | 109600243 A | 4/2019 |
| CN | 109600262 A | 4/2019 |
| CN | 109600759 A | 4/2019 |
| CN | 109698760 A | 4/2019 |
| CN | 109842906 A | 6/2019 |
| CN | 109845338 A | 6/2019 |
| WO | 2018161850 A1 | 9/2018 |
| WO | 2019032968 A1 | 2/2019 |

OTHER PUBLICATIONS

3GPP TS 23.288 V0.5.0 (May 2019);3rd Generation Partnership Project;Technical Specification Group Services and System Aspects;Architecture enhancements for 5G System (5GS) to support network data analytics services(Release 16),total 52 pages.
Orange et al.,"Use of NRF services for Data Collection",SA WG2 Meeting #129 S2-1810102,Oct. 15-19, 2018, Dongguan, P. R. China,total 3 pages.
3GPP TS 23.288 V16.0.0 (Jun. 2019);3rd Generation Partnership Project;Technical Specification Group Services and System Aspects;Architecture enhancements for 5G System (5GS) to support network data analytics services(Release 16),total 52 pages.
ETSI GS NFV-IFA 013 V3.2.1 (Apr. 2019),Network Functions Virtualisation (NFV) Release 3;Management and Orchestration;Os-Ma-Nfvo reference point—Interface and Information Model Specification,total 192 pages.
3GPP TS 23.502 V0.4.0 (May 2017);3rd Generation Partnership Project;Technical Specification Group Services and System Aspects;Procedures for the 5G System;Stage 2(Release 15),ttal 124 Pages.
3GPP TS 23.288 V0.4.0 (Apr. 2019);3rd Generation Partnership Project;Technical Specification Group Services and System Aspects;Architecture enhancements for 5G System (5GS) to support network data analytics services(Release 16),total 48 pages.
3GPP TR 23.791 V16.2.0 (Jun. 2019);3rd Generation Partnership Project;Technical Specification Group Services and System Aspects;Study of Enablers for Network Automation for 5G(Release 16),Total 124 Pages.
ETSI GS NFV-IFA 011 V3.2.1 (Apr. 2019),Network Functions Virtualisation (NFV) Release 3;Management and Orchestration;VNF Descriptor and Packaging Specification, Total 79 Pages.
3GPP TS 28.522 V15.0.0 (Jun. 2018); 3rd Generation Partnership Project;Technical Specification Group Services and System Aspects;Telecommunication management;Performance Management (PM) for mobile networks that include virtualized network functions;Stage 2 (Release 15),total 7 pages.
ETSI GS NFV-IFA 011 V2.4.1 (Feb. 2018), Network Functions Virtualisation (NFV) Release 2; Management and Orchestration; VNF Descriptor and Packaging Specification, Feb. 2018. total 60 pages.
3GPP TS 28.552 V16.2.0 (Jun. 2019);3rd Generation Partnership Project;Technical Specification Group Services and System Aspects;Management and orchestration;5G performance measurements(Release 16),total 98 pages.
3GPP TS 23.503 V16.1.0 (Jun. 2019);3rd Generation Partnership Project;Technical Specification Group Services and System Aspects;Policy and Charging Control Framework for the 5G System;Stage 2(Release 16),total 98 pages.
Samsung, "Update to NF Load Analytics Procedures",3GPP SA WG2 Meeting #132 S2-1903917(revision of S2-1903254),Apr. 8-12, 2019, Xi an, China,total 3 pages.
3GPP TS 28.510 V15.0.0 (Jun. 2018);3rd Generation Partnership Project;Technical Specification Group Services and System Aspects;Telecommunication Management;Configuration Management (CM) for mobile networks that include virtualized network functions;Requirements (Release 15),total 18 pages.
Orange,"NF Load Analytics",3GPP TSG-SA WG2 Meeting #132 S2-1904003,Apr. 8-12, 2019, Xi''an, China, total 4 pages.
3GPP TS 28.511 V15.0.0 (Jun. 2018);3rd Generation Partnership Project;Technical Specification Group Services and System Aspects;Telecommunication Management;Configuration Management (CM) for mobile networks that include virtualized network functions; Procedures (Release 15),total 12 pages.
3GPP TS 28.512 V15.0.0 (Jun. 2018);3rd Generation Partnership Project;Technical Specification Group Services and System Aspects;Telecommunication Management;Configuration Management (CM) for mobile networks that include virtualized network functions;Stage 2 (Release 15),total 7 pages.
3GPP TS 28.513 V15.0.0 (Jun. 2018);3rd Generation Partnership Project;Technical Specification Group Services and System Aspects;Telecommunication management;Configuration Management (CM) for mobile networks that include virtualized network functions;Stage 3(Release 15),total 7 pages.
3GPP TS 28.515 V15.0.0 (Jun. 2018);3rd Generation Partnership Project;Technical Specification Group Services and System Aspects;Telecommunication management;Fault Management (FM) for mobile networks that include virtualized network functions;Requirements(Release 15),total 13 pages.
3GPP TS 28.516 V15.0.0 (Jun. 2018);3rd Generation Partnership Project;Technical Specification Group Services and System Aspects;Telecommunication management;Fault Management (FM) for mobile networks that include virtualized network functions;Procedures(Release 15),total 12 pages.
3GPP TS 28.517 V15.0.0 (Jun. 2018)3rd Generation Partnership Project;Technical Specification Group Services and System Aspects;Telecommunication management;Fault Management (FM) for mobile networks that include virtualized network functions;Stage 2(Release 15),total 10 pages.
3GPP TS 28.518 V15.0.0 (Jun. 2018)3rd Generation Partnership Project;Technical Specification Group Services and System Aspects;Telecommunication management;Fault Management (FM) for mobile networks that include virtualized network functions;Stage 3(Release 15),total 7 pages.
3GPP TS 28.520 V15.0.0 (Jun. 2018)3rd Generation Partnership Project;Technical Specification Group Services and System Aspects;Telecommunication management;Performance Management (PM) for mobile networks that include virtualized network functions;Requirements(Release 15),total 17 pages.
3GPP TS 28.521 V15.0.0 (Jun. 2018)3rd Generation Partnership Project;Technical Specification Group Services and System Aspects;Telecommunication management;Performance Manage-

(56) References Cited

OTHER PUBLICATIONS ment (PM) for mobile networks that include virtualized network functions;Procedures(Release 15),total 12 pages.
3GPP TS 28.523 V15.0.0 (Jun. 2018)3rd Generation Partnership Project;Technical Specification Group Services and System Aspects;Telecommunication management;Performance Management (PM) for mobile networks that include virtualized network functions;Stage 3(Release 15),total 7 pages.
3GPP TS 28.525 V15.0.0 (Jun. 2018)3rd Generation Partnership Project;Technical Specification Group Services and System Aspects;Telecommunication management;Life Cycle Management (LCM) for mobile networks that include virtualized network functions;Requirements(Release 15),total 51 pages.
3GPP TS 28.526 V15.1.0 (Dec. 2018)3rd Generation Partnership Project;Technical Specification Group Services and System Aspects;Telecommunication management;Life Cycle Management (LCM) for mobile networks that include virtualized network functions;Procedures(Release 15),total 39 pages.
3GPP TS 28.527 V15.0.0 (Jun. 2018)3rd Generation Partnership Project;Technical Specification Group Services and System Aspects;Telecommunication management;Life Cycle Management (LCM) for mobile networks that include virtualized network functions;Stage 2(Release 15),total 7 pages.
3GPP TS 28.528 V15.1.0 (Dec. 2018)3rd Generation Partnership Project;Technical Specification Group Services and System Aspects;Telecommunication management;Life Cycle Management (LCM) for mobile networks that include virtualized network functions;Stage 3(Release 15),total 7 pages.
3GPP TS 28.533 V16.0.0 (Jun. 2019)3rd Generation Partnership Project;Technical Specification Group Services and System Aspects;Management and orchestration;Architecture framework(Release 16),total 26 pages.
3GPP TS 29.244 V16.0.0 (Jun. 2019)3rd Generation Partnership Project;Technical Specification Group Core Network and Terminals;Interface between the Control Plane and the User Plane Nodes;Stage 3(Release 16),total 217 pages.
3GPP TS 29.510 V16.0.0 (Jun. 2019)3rd Generation Partnership Project;Technical Specification Group Core Network and Terminals;5G System;Network Function Repository Services;Stage 3(Release 16),total 135 pages.
3GPP TS 29.520 V15.3.0 (Mar. 2019)3rd Generation Partnership Project;Technical Specification Group Core Network and Terminals;5G System;Network Data Analytics Services;Stage 3(Release 15),total 39 pages.

\* cited by examiner

DATA PROCESSING METHOD AND APPARATUS

CROSS-REFERENCE TO RELATED APPLICATION

This application is a continuation of International Application No. PCT/CN2020/096391, filed on Jun. 16, 2020, which claims priority to Chinese Patent Application No. 201910522986.1, filed on Jun. 17, 2019. The disclosure of the aforementioned applications are hereby incorporated by reference in their entireties.

TECHNICAL FIELD

This application relates to the field of communications technologies, and in particular, to a data processing method and apparatus.

BACKGROUND

A 5th generation (5G) mobile communications technology has a complex topology structure. To ensure network performance and service experience, a network data analytics function (NWDAF) is introduced into the 5G mobile communications technology. The NWDAF receives an analysis request from a requester, and then collects resource data of a target network function (NF) instance. The NWDAF analyzes the collected data to obtain an analysis result.

An existing method for analyzing resource data of an NF instance is inaccurate.

SUMMARY

Embodiments of this application provide a data processing method and apparatus, to improve accuracy of an analysis result of a target network element.

To achieve the foregoing objective, the following technical solutions are used in the embodiments of this application.

According to a first aspect, this application provides a data processing method, and the method may be performed by a data analysis network element. The method includes: receiving, by the data analysis network element, an analysis request from a requester; after receiving the analysis request, obtaining, by the data analysis network element, load data of a target network element based on the analysis request; generating an analysis result of the target network element based on the obtained load data; and sending the analysis result to the requester. The analysis request includes information about the target network element, and the load data includes service load information.

According to the data processing method provided in this application, the data analysis network element receives the analysis request from the requester, obtains the load data of the target network element based on the analysis request, generates the analysis result of the target network element based on the load data after obtaining the load data, and sends the analysis result to the requester. The analysis request includes the information about the target network element, and the load data includes the service load information. Compared with the conventional technology in which the data analysis network element can obtain only resource data of the target network element and provide a resource analysis result of the target network element for the requester, the analysis result cannot accurately show a load status of the target network element, and accuracy of the analysis result is poor. According to the data processing method in this embodiment of this application, the load data of the target network element can be obtained, and the load data includes the service load information. Compared with the resource data of the target network element, the load data can more accurately indicate the load status of the target network element. The analysis result obtained based on the load data can accurately present the load status of the target network element, and accuracy is high.

In a possible design, the service load information at least includes at least one of a service load, an upper limit of the service load, or a ratio of the service load. The service load may be a key performance indicator KPI of the target network element. Different network elements correspond to different KPIs. When the target network element belongs to one network slice, the service load of the target network element is a KPI of the entire target network element. A session management function SMF is used as an example. A KPI of the SMF may be an average quantity of sessions in a connected state. When the target network element belongs to a plurality of network slices, the load data may alternatively be a service load that is related to a network slice and that is of the target network element, namely, a service load of the target network element that belongs to the network slice. An access and mobility management function AMF is used as an example. A KPI of the target network element that belongs to the network slice may be a statistical result obtained after an average quantity of registered users is divided based on the network slice.

In a possible design, the analysis result includes at least one of an average value or a peak value of the service load information of the target network element.

In a possible design, the data processing method provided in this application further includes:

The data analysis network element obtains overload information about the target network element based on the analysis request.

The data analysis network element generates an overload analysis result of the target network element based on the overload information.

The data analysis network element sends the overload analysis result to the requester.

In this way, the data analysis network element can further analyze an overload condition of the target network element based on the analysis request to provide the overload analysis result for the requester, so that the analysis result is more accurate and more comprehensive.

In a possible design, the overload analysis result includes a probability that the target network element is overloaded.

In a possible design, the load data further includes resource load information, and the analysis result further includes at least one of an average value or a peak value of the resource load information of the target network element. The resource load information includes at least one of a resource load or a resource load upper limit. The resource load indicates a resource actually occupied by the target network element, for example, a running status of a central processing unit CPU or a usage status of a memory. The resource load upper limit indicates a maximum allowed quantity of resources occupied by the target network element, for example, a maximum memory that can be occupied.

In a possible design, the analysis request further includes information about a network slice, and the load data is load data corresponding to the network slice.

In a possible design, the target network element belongs to a plurality of network slices, the target network element includes a public module, and the public module is configured to process services of the plurality of network slices. The data processing method provided in this application further includes:

The data analysis network element obtains, based on service load information corresponding to the plurality of slices and resource load information of the public module, resource load information of the public module that belongs to the network slice corresponding to the information about the network slice.

In this way, when the analysis request includes the information about the network slice, even if the target network element belongs to the plurality of network slices, the data analysis network element can determine, based on the service load information corresponding to the plurality of slices and the resource load information of the public module, the resource load information of the public module in the target network element that belongs to the network slice corresponding to the information about the network slice, to provide, for the requester, an analysis result of a resource of the target network element that belongs to the network slice.

In a possible design, the target network element further includes a plurality of dedicated modules, and the plurality of dedicated modules are configured to respectively process the services of the plurality of network slices; the resource load information includes resource load information of a dedicated module of the network slice corresponding to the information about the network slice and the resource load information of the public module of the plurality of slices; and the data processing method provided in this application further includes:

The data analysis network element obtains, based on the resource load information of the dedicated module and the resource load information of the public module that belongs to the network slice corresponding to the information about the network slice, resource load information of the target network element that belongs to the network slice corresponding to the information about the network slice.

In this way, when the analysis request includes the information about the network slice, both the dedicated module and the public module in the target network element can process a service of the network slice corresponding to the information about the network slice. The data analysis network element can also determine, based on the resource load information of the dedicated module and the resource load information of the public module that belongs to the network slice corresponding to the information about the network slice, the resource load information of the target network element that belongs to the network slice corresponding to the information about the network slice, to provide, for the requester, the analysis result of the resource of the target network element that belongs to the network slice.

In a possible design, the service load information includes load data related to a quality of service flow.

In a possible design, the load data related to the quality of service flow includes one or more pieces of the following information: quality of service flow data, performance measurement data of the quality of service flow, or a ratio of a service load that is related to the quality of service flow and that is of the target network element to a maximum service load of the quality of service flow.

In a possible design, the service load information includes load data related to a quality of service flow of a service type of the target network element. The analysis result includes at least one of an average value or a peak value of the load data related to the quality of service flow of the service type of the target network element.

In a possible design, the service load information includes load data related to quality of service flows of a plurality of service types of the target network element. The analysis result includes at least one of an average value or a peak value of the service load information of the target network element under conditions of the plurality of service types and different service load ratios.

In a possible design, the obtaining, by the data analysis network element, load data of a target network element based on the analysis request includes:

The data analysis network element obtains historical load data from operations, administration and maintenance OAM based on the analysis request, where the historical load data includes one or more of the service load, the upper limit of the service load, or the performance measurement data of the quality of service flow.

In this way, the data analysis network element may obtain the historical load data of the target network element from the OAM, for example, the service load, the upper limit of the service load, and the performance measurement data of the quality of service flow, to perform analysis based on the obtained historical load data, so as to obtain the analysis result.

In a possible design, the obtaining, by the data analysis network element, load data of a target network element based on the analysis request includes:

The data analysis network element obtains current load data from a network repository function NRF based on the analysis request, where the current load data includes at least one of the ratio of the service load or the ratio of the load that is related to the quality of service flow and that is of the target network element to the maximum service load of the quality of service flow.

In this way, the data analysis network element may obtain the current load data of the target network element from the NRF, for example, the ratio of the service load and the ratio of the load that is related to the quality of service flow and that is of the target network element to the maximum service load of the quality of service flow, to perform analysis based on the obtained current load data, so as to obtain the analysis result.

According to a second aspect, this application provides a communications method, and the method may be performed by a network element corresponding to a requester. The method includes: After sending an analysis request to a data analysis network element, the requester receives an analysis result from the data analysis network element, and performs a processing operation based on the analysis result. The analysis request includes information about a target network element.

In this way, the requester receives the analysis result from the data analysis network element, and because the analysis result can accurately present a load status of the target network element, accuracy is high. The requester may perform the processing operation, for example, network function selection, network path selection, or network resource adjustment, based on a more accurate analysis result, thereby greatly reducing a probability that the network element is overload.

In a possible design, that the requester performs a processing operation based on the analysis result includes: selecting the target network element based on the analysis result. For example, a target network element whose load meets a requirement and/or a target network element whose resource condition meets a requirement are/is selected.

In a possible design, the target network element may be a user plane function network element, and the requester may be a session management function network element.

According to a third aspect, this application provides a data processing apparatus. The apparatus may be the data analysis network element in the first aspect. The apparatus includes a processing unit, a receiving unit, and a sending unit. Specifically, the receiving unit is configured to receive an analysis request from a requester, where the analysis request includes information about a target network element. The receiving unit is further configured to obtain load data of the target network element based on the analysis request, where the load data includes service load information. The processing unit is configured to generate an analysis result of the target network element based on the load data. The sending unit is configured to send the analysis result to the requester.

In a possible design, the service load information at least includes at least one of a service load, an upper limit of the service load, or a ratio of the service load.

In a possible design, the analysis result includes at least one of an average value or a peak value of the service load information of the target network element.

In a possible design, the receiving unit is further configured to obtain overload information of the target network element based on the analysis request;
the processing unit is further configured to generate an overload analysis result of the target network element based on the overload information; and
the sending unit is further configured to send the overload analysis result to the requester.

In a possible design, the overload analysis result includes a probability that the target network element is overloaded.

In a possible design, the load data further includes resource load information, and the analysis result further includes at least one of an average value or a peak value of the resource load information of the target network element.

In a possible design, the analysis request further includes information about a network slice, and the load data is load data corresponding to the network slice.

In a possible design, the target network element belongs to a plurality of network slices, the target network element includes a public module, and the public module is configured to process services of the plurality of network slices; and
the processing unit is further configured to obtain, based on service load information corresponding to the plurality of slices and resource load information of the public module, resource load information of the public module that belongs to the network slice corresponding to the information about the network slice.

In a possible design, the target network element further includes a plurality of dedicated modules, and the plurality of dedicated modules are configured to respectively process the services of the plurality of network slices;
the resource load information includes resource load information of a dedicated module of the network slice corresponding to the information about the network slice and the resource load information of the public module of the plurality of slices; and
the processing unit is further configured to obtain, based on the resource load information of the dedicated module and the resource load information of the public module that belongs to the network slice corresponding to the information about the network slice, resource load information of the target network element that belongs to the network slice corresponding to the information about the network slice.

In a possible design, the service load information includes load data related to a quality of service flow.

In a possible design, the load data related to the quality of service flow includes one or more pieces of the following information: quality of service flow data, performance measurement data of the quality of service flow, or a ratio of a service load that is related to the quality of service flow and that is of the target network element to a maximum service load of the quality of service flow.

In a possible design, the service load information includes load data related to a quality of service flow of a service type of the target network element. The analysis result includes at least one of an average value or a peak value of the load data related to the quality of service flow of the service type of the target network element.

In a possible design, the service load information includes load data related to quality of service flows of a plurality of service types of the target network element. The analysis result includes at least one of an average value or a peak value of the service load information of the target network element under conditions of the plurality of service types and different service load ratios.

In a possible design, that the receiving unit is configured to obtain load data of the target network element based on the analysis request is specifically: obtaining historical load data from operations, administration and maintenance OAM based on the analysis request, where the historical load data includes one or more of the service load, the upper limit of the service load, or the performance measurement data of the quality of service flow.

In a possible design, that the receiving unit is configured to obtain load data of the target network element based on the analysis request is specifically: obtaining current load data from a network repository function NRF based on the analysis request, where the current load data includes at least one of the ratio of the service load or the ratio of load that is related to the quality of service flow and that is of the target network element to the maximum service load of the quality of service flow.

According to a fourth aspect, this application provides a communications apparatus. The apparatus may be the network element corresponding to the requester in the second aspect. The apparatus includes a processing unit, a receiving unit, and a sending unit. Specifically, the sending unit is configured to send an analysis request to a data analysis network element, where the analysis request includes information about a target network element. The receiving unit is configured to receive an analysis result from the data analysis network element. The processing unit is configured to perform a processing operation based on the analysis result.

In a possible design, that the processing unit is configured to perform a processing operation based on the analysis result is specifically: selecting the target network element based on the analysis result. For example, a target network element whose load meets a requirement and/or a target network element whose resource condition meets a requirement are/is selected.

In a possible design, the target network element may be a user plane function network element, and the requester may be a session management function network element.

According to a fifth aspect, this application provides a data processing apparatus, configured to implement a function of the data analysis network element in the first aspect, or configured to implement a function of the requester in the second aspect.

According to a sixth aspect, this application provides a data processing apparatus. The apparatus has a function of implementing the data processing method according to any one of the foregoing aspects. The function may be implemented by hardware, or may be implemented by hardware by executing corresponding software. The hardware or the software includes one or more modules corresponding to the function.

According to a seventh aspect, this application provides a data processing apparatus, including a processor and a memory. The memory is configured to store computer-executable instructions, and when the data processing apparatus runs, the processor executes the computer-executable instructions stored in the memory, to enable the data processing apparatus to perform the data processing method according to any one of the foregoing aspects.

According to an eighth aspect, this application provides a data processing apparatus, including a processor. The processor is configured to: after being coupled to a memory and reading instructions in the memory, perform, according to the instructions, the data processing method according to any one of the foregoing aspects.

According to a ninth aspect, this application provides a computer-readable storage medium. The computer-readable storage medium stores instructions, and when the instructions are run on a computer, the computer may be enabled to perform the data processing method according to any one of the foregoing aspects.

According to a tenth aspect, this application provides a computer program product including instructions. When the computer program product runs on a computer, the computer may be enabled to perform the data processing method according to any one of the foregoing aspects.

According to an eleventh aspect, this application provides a circuit system, where the circuit system includes a processing circuit, and the processing circuit is configured to perform the data processing method according to any one of the foregoing aspects.

According to a twelfth aspect, this application provides a chip, where the chip includes a processor, the processor is coupled to a memory, the memory stores program instructions, and when the program instructions stored in the memory are executed by the processor, the data processing method according to any one of the foregoing aspects is implemented.

According to a thirteenth aspect, this application provides a communications system. The communications system includes the data analysis network element in any one of the foregoing aspects, the network element corresponding to the requester in any one of the foregoing aspects, and a target network element.

For technical effects brought by any design manner of the second to the thirteenth aspects, refer to technical effects brought by different design manners of the first aspect, and details are not described herein again.

DESCRIPTION OF EMBODIMENTS

Figure 1:
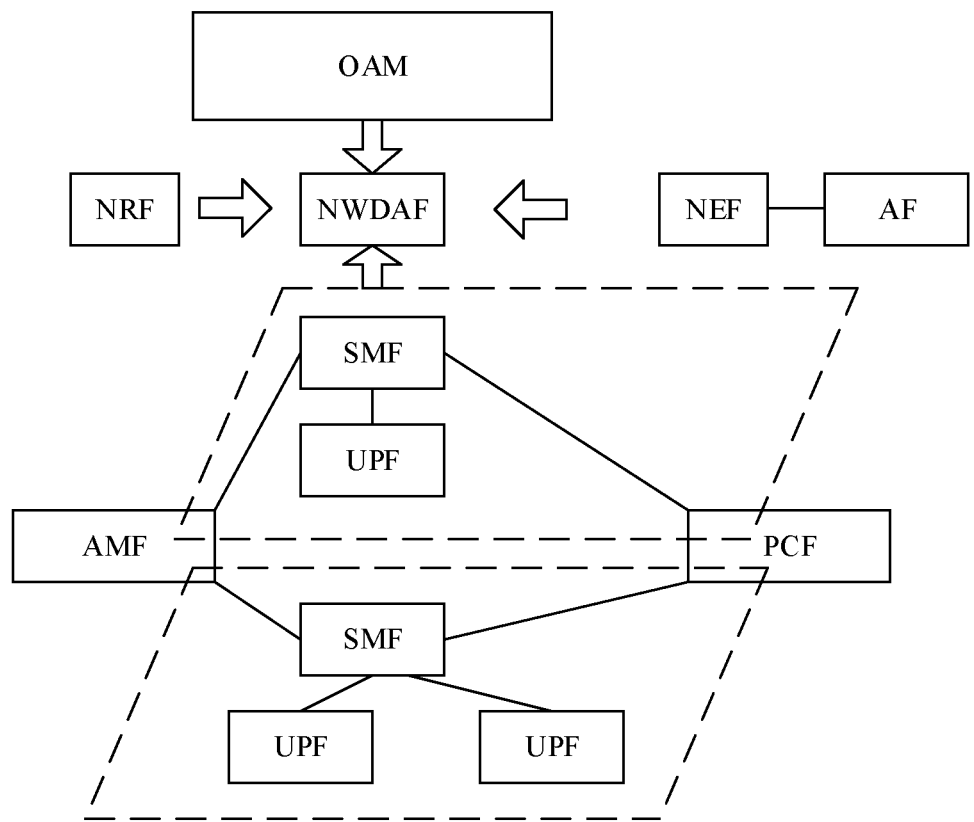
FIG. 1 is a diagram of a network architecture according to an embodiment of this application.

In the specification and accompanying drawings of this application, the terms "first", "second", and the like are intended to distinguish between different objects or distinguish between different processing of a same object, but do not indicate a particular sequence of the objects. In addition, the terms "including", "having", or any other variant thereof in descriptions of this application, are intended to cover non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example", "example", or the like is intended to present a relative concept in a specific manner.

To make the embodiments of this application clearer, related technologies in the embodiments of this application are first briefly described.

Network Slice (NS):

Because requirements of different communications services for network performance are significantly different, the NS is introduced into a 5th generation (5G) mobile communications technology proposed by the 3rd generation partnership project (3GPP), to meet differentiated requirements of the different communications services for the network performance. The NS is a logical network that is customized based on physical or virtual network infrastructure and different service requirements. The network slice may be a complete end-to-end network including a terminal, an access network, a transport network, a core network, and an application server. The network slice can provide a complete communications service and has a specific network capability. The network slice may alternatively be any combination of the terminal, the access network, the transport network, the core network, and the application server.

Generally, the NS is provided to a customer in a manner of network slice as a service (NSaaS). For example, an operator creates a network slice instance to provide a service for a third party, where the third party may include an enterprise, an internet service provider, an operator, and the like. The NS is identified by single network slice selection assistance information (S-NSSAI).

Network Slice Instance (NSI):

The NSI is instantiation of an NS, namely, a real running logical network that can meet a specific network feature or service requirement. One NSI may provide one or more services. The NSI may be created by a network slice management function device. One network slice management function device may create a plurality of NSIs, and simultaneously manage the plurality of NSIs, including but not limited to performance monitoring, fault management, and the like in a running process of the NSI. When the plurality of NSIs coexist, the NSIs may share some network resources and network functions. The NSI may be created from a network slice template, or may not be created from a network slice template. Generally, the NSI is identified by using a network slice instance identifier (NSI-ID).

Network Function (NF):

The NF is a processing function in a network, and defines a functional behavior and a functional interface. The NF may be implemented by using special-purpose hardware, may be implemented by running software on special-purpose hardware, or may be implemented in a form of a virtual function on a general-purpose hardware platform. Therefore, from a perspective of implementation, the NF may be classified into a physical network function and a virtual network function. From a perspective of use, the NF may be classified into a dedicated network function and a shared network function. Specifically, a plurality of network slice instances/network slice subnet instances may independently use different network functions, and these network functions are referred to as dedicated network functions. Alternatively, the plurality of network slice instances/network slice subnet instances may share a same network function, and this network function is referred to as a shared network function.

Network Data Analytics Function (NWDAF):

To ensure network performance and service experience, the NWDAF is introduced into a 5G mobile communications technology. The NWDAF may collect data from each network function (NF), an application function (AF), and operations, administration and management (OAM), and perform network function analysis and prediction. In the technical specification (TS) of the 3rd generation partnership project (3GPP), the NWDAF collects the data from the NF, the AF, and the OAM system in an event subscription manner, retrieves information from a data repository, and provides corresponding network function analysis and a prediction result based on a requirement of the NF, the AF, or the OAM.

The NF may include an access and mobility management function (AMF), a session management function (SMF), a policy control function (PCF), unified data management (UDM), a network exposure function (NEF), and a user plane function (UPF).

The OAM may include a network management system (NMS).

The data repository may include a unified data repository (UDR), a network repository function (NRF), and a network slice selection function (NSSF).

The NWDAF may be used as a data analysis network element. FIG. 1 shows a position of an NWDAF in a network architecture. The NWDAF may obtain data from an NRF, OAM, an NEF, and an SMF to generate an analysis result. The NEF can manage an AF. For example, referring to FIG. 1, one NEF may manage one AF. A dashed box indicates a network slice. One network slice may independently use some network functions. For example, there is an SMF and a UPF in each network slice. For example, referring to FIG. 1, there is one SMF and one UPF managed by the SMF in a first network slice, and there is one SMF and two UPFs managed by the SMF in a second network slice. A plurality of network slices may share some network functions, such as an AMF and a PCF.

As a data analysis network element, the NWDAF can only collect resource data, and then analyze the resource data to obtain a resource-related analysis result. Resource data of an NF is used as an example. The resource data of the NF indicates a resource status of the entire NF, and is irrelevant to both a service type and a network slice. An analysis result is obtained based on the resource data of the NF. In this way, the analysis result cannot correctly show a real load status of an instance of the NF, and accuracy of the analysis result is reduced.

Figure 2:
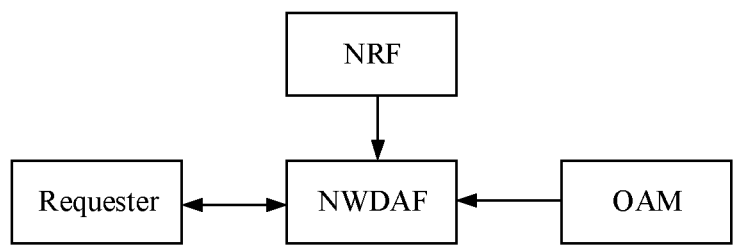
FIG. 2 is a diagram of a system architecture according to an embodiment of this application.

In view of this, an embodiment of this application provides a data processing method. The data processing method provided in this embodiment of this application is applicable to a data processing system shown in FIG. 2. Referring to FIG. 2, the system includes a requester, a data analysis network element, an NRF, and OAM. The requester can exchange information with the data analysis network element. For example, the requester sends an analysis request to the data analysis network element, where the analysis request includes information about a target network element. The requester can receive an analysis result from the data analysis network element, where the analysis result is an analysis result about the target network element. The data analysis network element can collect data from the NRF or the OAM. Alternatively, the data analysis network element can collect data from the target network element or a network element related to service processing of the target network element. The data analysis network element may be an NWDAF. The target network element may be a UPF, and the network element related to service processing of the target network element may be a network element that manages the target network element, for example, an SMF that manages the UPF. (Neither the target network element nor the network element related to service processing of the target network element is shown in FIG. 2).

An embodiment of this application provides a data processing method, and the method is applied to a network element load analysis process.

Figure 3:
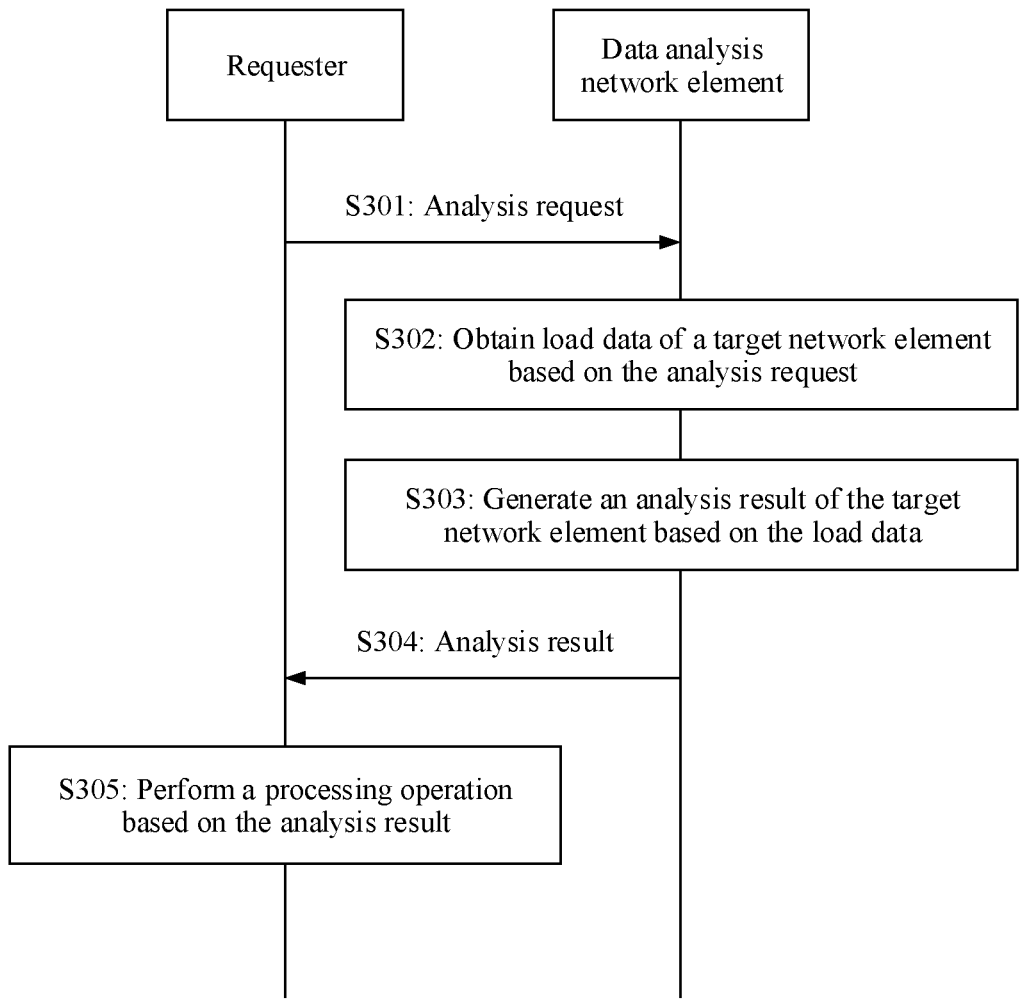
FIG. 3 is a flowchart of a data processing method according to an embodiment of this application.

Referring to FIG. 3, the data processing method in this embodiment of this application may include S301 to S305.

S301: A requester sends an analysis request to a data analysis network element.

Correspondingly, the data analysis network element receives the analysis request from the requester.

The requester may be an NF, an AF, or OAM.

The data analysis network element can collect data based on the analysis request, and provide a corresponding analysis result for the requester. For example, the data analysis network element may be an NWDAF.

The analysis request may include information about a target network element, to request to analyze a condition of the target network element. The information about the target network element may be an identifier of the target network element. For example, the identifier of the target network element may be a target UPF instance identifier, to request to analyze a condition of a network element corresponding to the target UPF instance identifier. There may be one or more target network elements. The information about the target network element may alternatively be a type of the target network element. For example, the type of the target network element may be a UPF, to request to analyze conditions of all UPF network elements.

The analysis request may further include information about a network slice, to request to analyze a condition that the target network element belongs to the network slice. The information about the network slice may be a network slice identifier, for example, S-NSSAI or an NSI-ID. When the analysis request includes the information about the network slice, and when the data analysis network element performs S302, all obtained load data is load data corresponding to the network slice.

It should be noted that the analysis request may be a query-type analysis request, or may be a subscription-type analysis request. If the analysis request is the query-type request, the data analysis network element provides a one-time analysis result for the requester. If the analysis request is the subscription-type request, after providing the analysis result for the requester, the data analysis network element analyzes changed load data when the load data changes, to obtain a new analysis result, or periodically analyzes the load data based on a requirement of the requester, to obtain a new analysis result. The new analysis result is sent to the requester until the subscription-type analysis request is canceled. For both the query-type analysis request and the subscription-type analysis request, refer to the conventional technology. Details are not described herein.

S302: The data analysis network element obtains load data of the target network element based on the analysis request.

The load data may include service load information, so that the data analysis network element generates a load-related analysis result. The load data may further include resource load information, so that the data analysis network element generates a resource-related analysis result.

In a first possible implementation, the load data includes the service load information. The service load information at least includes at least one of a service load, an upper limit of the service load, or a ratio of the service load. For example, the service load information may include any one of the service load, the upper limit of the service load, and the ratio of the service load, may include any two of the service load, the upper limit of the service load, and the ratio of the service load, or may include the service load, the upper limit of the service load, and the ratio of the service load.

The service load may be a key performance indicator (KPI) of the target network element. Different network elements correspond to different KPIs. When the target network element belongs to one network slice, the service load of the target network element is a KPI of the entire target network element. An SMF is used as an example. A KPI of the SMF may be an average quantity of sessions in a connected state. When the target network element belongs to a plurality of network slices, the load data may alternatively be a service load that is related to a network slice and that is of the target network element, namely, a service load of the target network element that belongs to the network slice. An AMF is used as an example. A KPI of the target network element that belongs to the network slice may be a statistical result obtained after an average quantity of registered users is divided based on the network slice.

The upper limit of the service load is a service load maximum value. Regardless of whether the target network element belongs to one network slice or a plurality of network slices, the upper limit of the service load of the target network element is a smaller value of the following two values: (1) a maximum value of a service load supported by a resource that can be used by the target network element; and (2) a maximum value of a service load that can be configured for the target network element that belongs to a target network slice, for example, a maximum quantity of registered users supported by the target network slice in a service area of the target network element. The target network slice is a slice corresponding to the information about the network slice in the analysis request.

The ratio of the service load may be a ratio of the service load of the target network element to a maximum service load. When the target network element exclusively belongs to a network slice, the ratio of the service load may be a ratio of the service load of the target network element to the maximum service load of the target network element. When the target network element belongs to the plurality of network slices, the ratio of the service load may be a ratio of a service load of the target network element that belongs to a network slice to a maximum service load of the network slice. Herein, a service load of the target network element that belongs to a specific network slice may be determined based on information about the network slice in the analysis request.

In this way, when the load data includes the service load information, the data analysis network element may analyze a load of the target network element based on the service load information, to generate a load-related analysis result, so that the requester selects a network element with a relatively low load based on the load-related analysis result. For example, when the access and mobility management function AMF is used as a requester, the AMF selects, based on an analysis result, a session management function SMF with a relatively low current load, to avoid SMF overload.

The service load information further includes load data related to a quality of service flow (QoS Flow). The load data related to the quality of service flow includes one or more pieces of the following information: quality of service flow data, performance measurement data of the quality of service flow, or a ratio of the service load that is related to the quality of service flow and that is of the target network element to a maximum service load of the quality of service flow.

The quality of service flow data may include a quality of service (QoS) configuration, a QoS parameter, a QoS feature, and the like. The quality of service flow data may be classified into quality of service flow data of different service types. For example, the quality of service flow data may be classified into quality of service flow data of three service types: a guaranteed bit rate quality of service flow (GBR QoS Flow), a delay-critical guaranteed bit rate quality of service flow (QoS Flow), and a non-guaranteed bit rate quality of service flow (non-GBR QoS Flow). In addition, the quality of service flow data may further use different quality of service class identifiers (QCI) or a 5th generation communications quality of service identifier (5QI), to classify service types at a finer granularity, for example, quality of service flow data of different QCIs, or quality of service flow data of different SQIs.

The performance measurement data of the quality of service flow may include one or more pieces of the following information: a quantity of established quality of service flows, a quantity of released quality of service flows, or information about sustainability of the quality of service flow.

For description of "the ratio of the service load that is related to the quality of service flow and that is of the target network element to the maximum service load of the quality of service flow", a delay-critical GBR service is used as an example herein, and the maximum service load of the quality of service flow may be that a maximum forwarding speed of the service is 1000 Mbps. A UPF supports the service, and 600 Mbps has been allocated to this type of quality of service flow. In this case, the ratio is 60%.

It should be noted that the service load information may include load data related to a quality of service flow of a service type. For example, the service load information may be load data related to a quality of service flow of a service type. In this case, the data analysis network element analyzes the load data related to the quality of service flow of the service type, to generate an analysis result of the target network element. The analysis result is a load analysis result of a service type. The analysis result may specifically include an average value of service data information related to the quality of service flow of the service type, may include a peak value of service data information related to the quality of service flow of the service type, or may include an average value and a peak value of service data information related to the quality of service flow of the service type.

The service load information may alternatively include load data related to quality of service flows of a plurality of service types. In this case, the data analysis network element analyzes the load data related to the quality of service flows of the plurality of service types, to generate an analysis result of the target network element. The analysis result is a load analysis result of the plurality of service types at different service load ratios. For example, an average value and a peak value of service load information of two service types when a ratio of the service load is 2:8. Similarly, the load analysis result of the plurality of service types at the different service load ratios may include an average value of the service load information, may include a peak value of the service load information, or may include an average value and a peak value of the service load information. In this way, the service load information may include the load data related to the quality of service flow of the one service type, or may include the load data related to the quality of service flows of the plurality of service types, to meet analysis requirements of the requester in different scenarios and provide a plurality of analysis results for the requester.

In a second possible implementation, the load data further includes the resource load information, so that the data analysis network element analyzes a resource condition of the target network element. The resource load information includes at least one of a resource load or a resource load upper limit. The resource load indicates a resource actually occupied by the target network element, for example, a running status of a central processing unit (CPU) and a usage status of a memory. The resource load upper limit indicates a maximum allowed quantity of resources occupied by the target network element, for example, a maximum memory that can be occupied.

When the target network element belongs to one network slice, a resource load of the target network element that belongs to the network slice is the same as the resource load of the entire target network element. A resource load upper limit of the target network element that belongs to the network slice is the same as the resource load upper limit of the entire target network element.

When the target network element belongs to a plurality of network slices, the target network element may include a dedicated module and a public module, and the public module is configured to process services of the plurality of network slices to which the target network element belongs. For example, the public module may be a network transceiver module or a service distribution module. One dedicated module is configured to process a service of only one network slice in the plurality of network slices. For example, the dedicated module may be a signaling processing module, and there may be one or more dedicated modules. The target network element may include one dedicated module, to process a service of a network slice in the plurality of network slices to which the target network element belongs. Alternatively, the target network element may include two dedicated modules, to separately process a service of a network slice in the plurality of network slices to which the target network element belongs. Alternatively, the target network element may include a plurality of dedicated modules. In other words, each of the plurality of network slices corresponds to one dedicated module.

Figure 4:
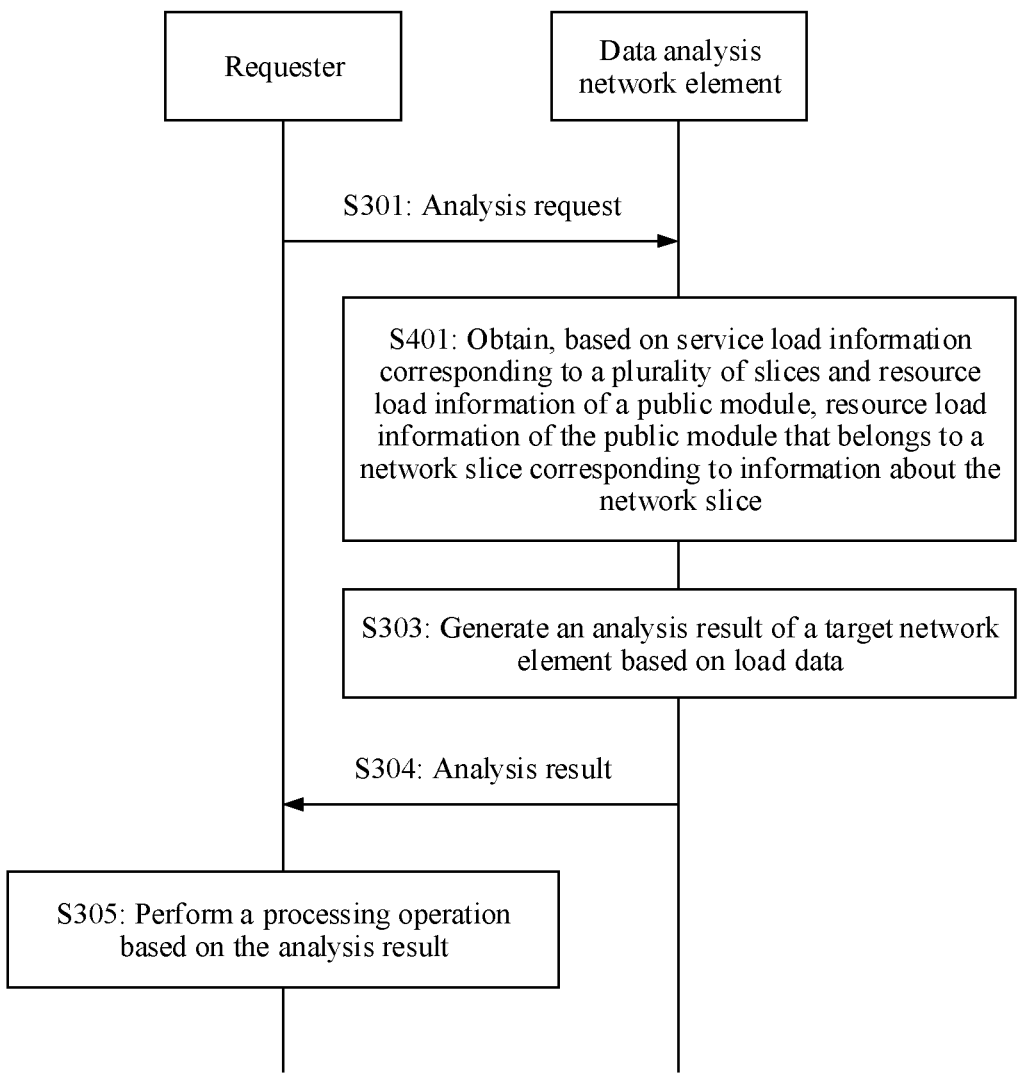
FIG. 4 is a flowchart of a method for generating a resource-related analysis result according to an embodiment of this application.

Referring to FIG. 4, when the analysis request includes the information about the network slice, according to the data processing method in this embodiment of this application, a resource condition that the target network element belongs to the network slice can be further analyzed. If a service of the network slice corresponding to the information about the network slice is processed by only the public module, after performing S301, the data analysis network element may further perform S401, and then perform S303.

S401: The data analysis network element obtains, based on service load information corresponding to the plurality of slices and resource load information of the public module, resource load information of the public module that belongs to the network slice corresponding to the information about the network slice.

For example, service load information corresponding to each slice may be a quantity of registered users accessed by the network slice. The resource load information of the public module may be a quantity of resources occupied by the public module. The resource load information of the public module that belongs to the network slice corresponding to the information about the network slice satisfies the following formula:

$$A_1 = B_1 \times \frac{x_k}{x_1 + x_2 + \ldots + x_n}, \quad (1)$$

where
$A_1$ indicates the resource load information of the public module that belongs to the network slice corresponding to the information about the network slice; $B_1$ indicates the resource load information of the public module; n indicates a quantity of network slices to which the target network element belongs; k indicates the network slice corresponding to the information about the network slice; $x_1$ indicates service load information of the target network element that belongs to a first network slice in the n network slices; $x_2$ indicates service load information of the target network element that belongs to a second network slice in the n network slices; $x_n$ indicates service load information of the target network element that belongs to an $n^{th}$ network slice in the n network slices; and $x_k$ indicates service load information of the target network element that belongs to a $k^{th}$ network slice in the n network slices.

In this way, when the analysis request includes the information about the network slice, even if the target network element belongs to the plurality of network slices, the data analysis network element can determine, based on the service load information corresponding to the plurality of slices and the resource load information of the public module, the resource load information of the public module in the target network element that belongs to the network slice corresponding to the information about the network slice, to provide, for the requester, an analysis result of a resource of the target network element that belongs to the network slice.

Figure 5:
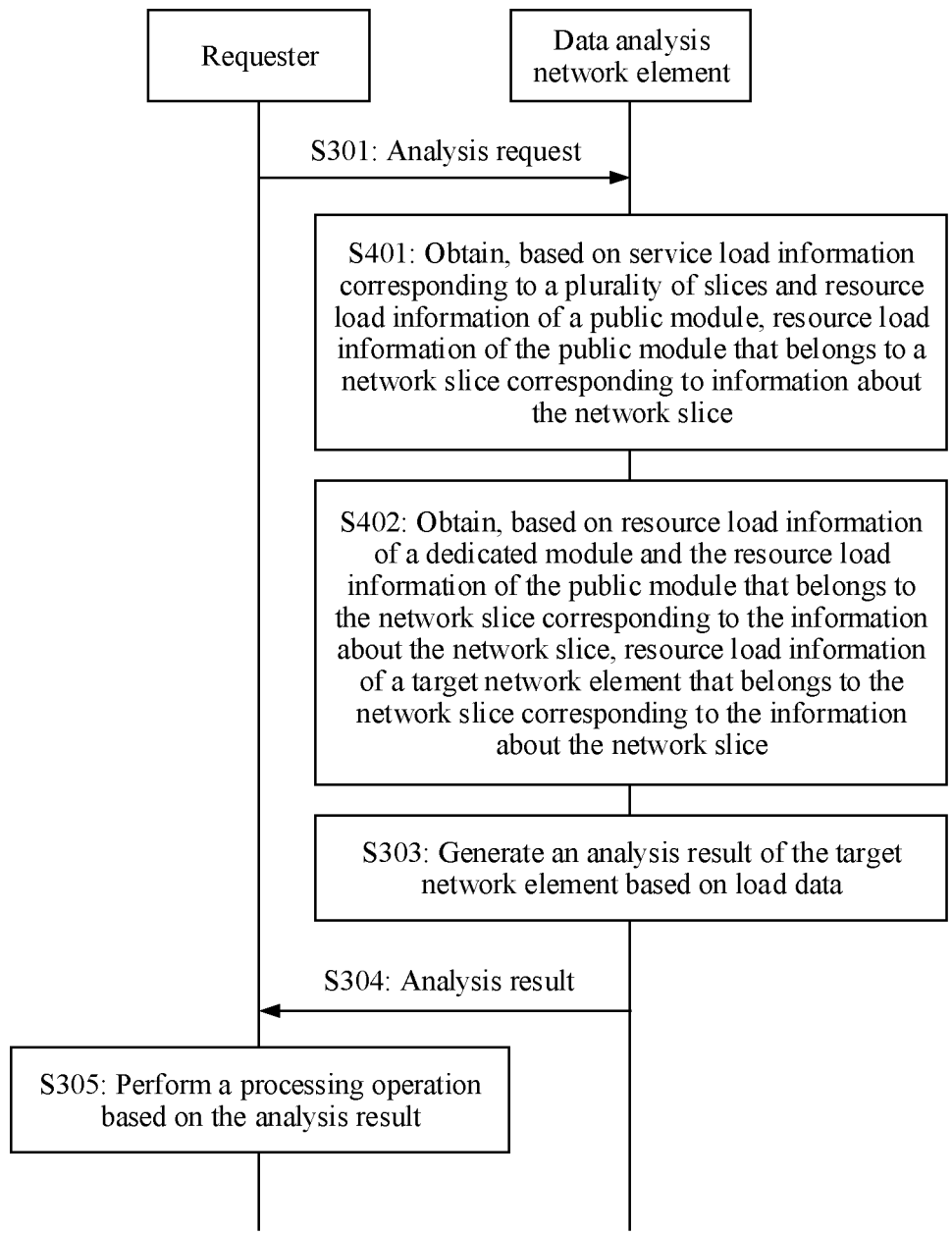
FIG. 5 is a flowchart of another method for generating a resource-related analysis result according to an embodiment of this application.

If a service of the network slice corresponding to the information about the network slice is processed by the dedicated module and the public module, refer to FIG. 5. After performing S301, the data analysis network element may further perform S401 and S402, and then perform S303.

S401: The data analysis network element obtains, based on service load information corresponding to the plurality of slices and resource load information of the public module, resource load information of the public module that belongs to the network slice corresponding to the information about the network slice.

S402: The data analysis network element obtains, based on resource load information of the dedicated module and the resource load information of the public module that belongs to the network slice corresponding to the information about the network slice, resource load information of the target network element that belongs to the network slice corresponding to the information about the network slice.

For example, the resource load information of the target network element that belongs to the network slice corresponding to the information about the network slice satisfies the following formula:

$$A = A_1 + A_2 = B_1 \times \frac{x_k}{x_1 + x_2 + \ldots + x_n} + A_2, \quad (2)$$

where

A indicates the resource load information of the target network element that belongs to the network slice corresponding to the information about the network slice; $A_1$ indicates the resource load information of the public module that belongs to the network slice corresponding to the information about the network slice; $A_2$ indicates resource load information of the dedicated module that belongs to the network slice corresponding to the information about the network slice; $B_1$ indicates the resource load information of the public module; n indicates a quantity of network slices to which the target network element belongs; k indicates the network slice corresponding to the information about the network slice; $x_1$ indicates service load information of the target network element that belongs to a first network slice in n network slices; $x_2$ indicates service load information of the target network element that belongs to a second network slice in the n network slices; $x_n$ indicates service load information of the target network element that belongs to an $n^{th}$ network slice in the n network slices; and $x_k$ indicates service load information of the target network element that belongs to a $k^{th}$ network slice in the n network slices.

In this way, when the analysis request includes the information about the network slice, both the dedicated module and the public module in the target network element can process a service of the network slice corresponding to the information about the network slice. The data analysis network element can also determine, based on the resource load information of the dedicated module and the resource load information of the public module that belongs to the network slice corresponding to the information about the network slice, the resource load information of the target network element that belongs to the network slice corresponding to the information about the network slice, to provide, for the requester, the analysis result of the resource of the target network element that belongs to the network slice.

It should be noted that when the target network element belongs to the plurality of network slices, the resource load indicates a resource actually occupied by the dedicated module or the public module in the target network element in a service processing process. The resource load upper limit indicates a maximum allowed quantity of resources that can be occupied by the dedicated module or public module in the target network element in the service processing process. When both $A_1$ and $B_1$ in the formula (1) indicate resource loads, it can be determined, according to formula (1), a resource load of the public module that belongs to the network slice corresponding to the information about the network slice. When both $A_1$ and $B_1$ in the formula (1) indicate resource load upper limits, it can be determined, according to the formula (1), a resource load upper limit of the public module that belongs to the network slice corresponding to the information about the network slice. Similarly, when all A, $A_1$, $A_2$, and $B_1$ in the formula (2) indicate resource loads, it can be determined, according to the formula (2), a resource load of the target network element that belongs to the network slice corresponding to the information about the network slice. When all A, $A_1$, $A_2$, and $B_1$ in the formula (2) indicate resource load upper limits, it can be determined, according to the formula (2), a resource load upper limit of the target network element that belongs to the network slice corresponding to the information about the network slice.

Figure 6:
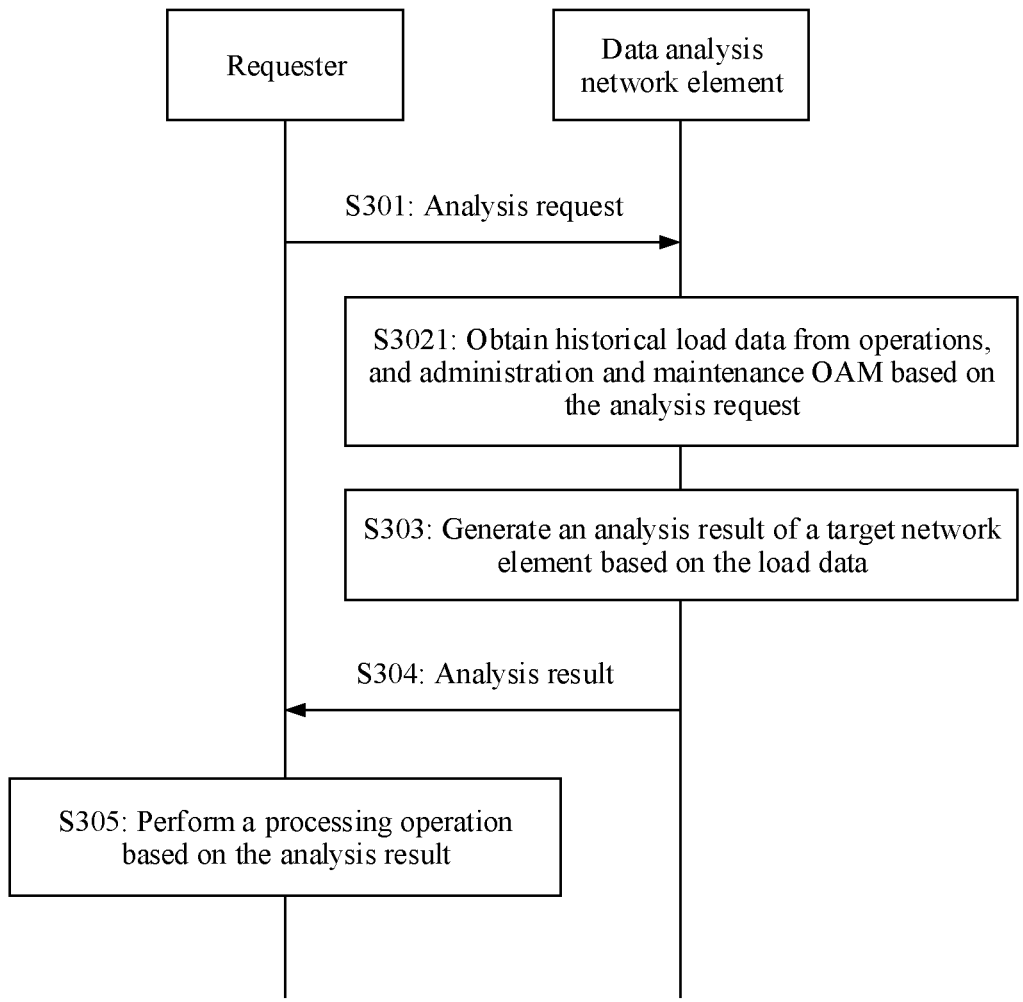
FIG. 6 is a flowchart of a data processing method according to an embodiment of this application.

It should be noted that the load data may include at least one of historical load data or current load data. Steps performed by the data analysis network element are different for different load data. When the load data is the historical load data, and the historical load data is one or more of the service load, the upper limit of the service load, or the performance measurement data of the quality of service flow, refer to FIG. 6. S302 may be specifically implemented as S3021.

S3021: The data analysis network element obtains the historical load data from operations, and administration and maintenance OAM based on the analysis request.

The OAM is a general name of various network entities that can perform network management. Main functions of the OAM include: completing routine network and service analysis, prediction, planning, and configuration; and testing the network and services of the network and performing routine operations for fault management. The OAM can store the history load data of the target network element.

The historical load data includes one or more of the service load, the upper limit of the service load, or the performance measurement data of the quality of service flow.

Figure 7:
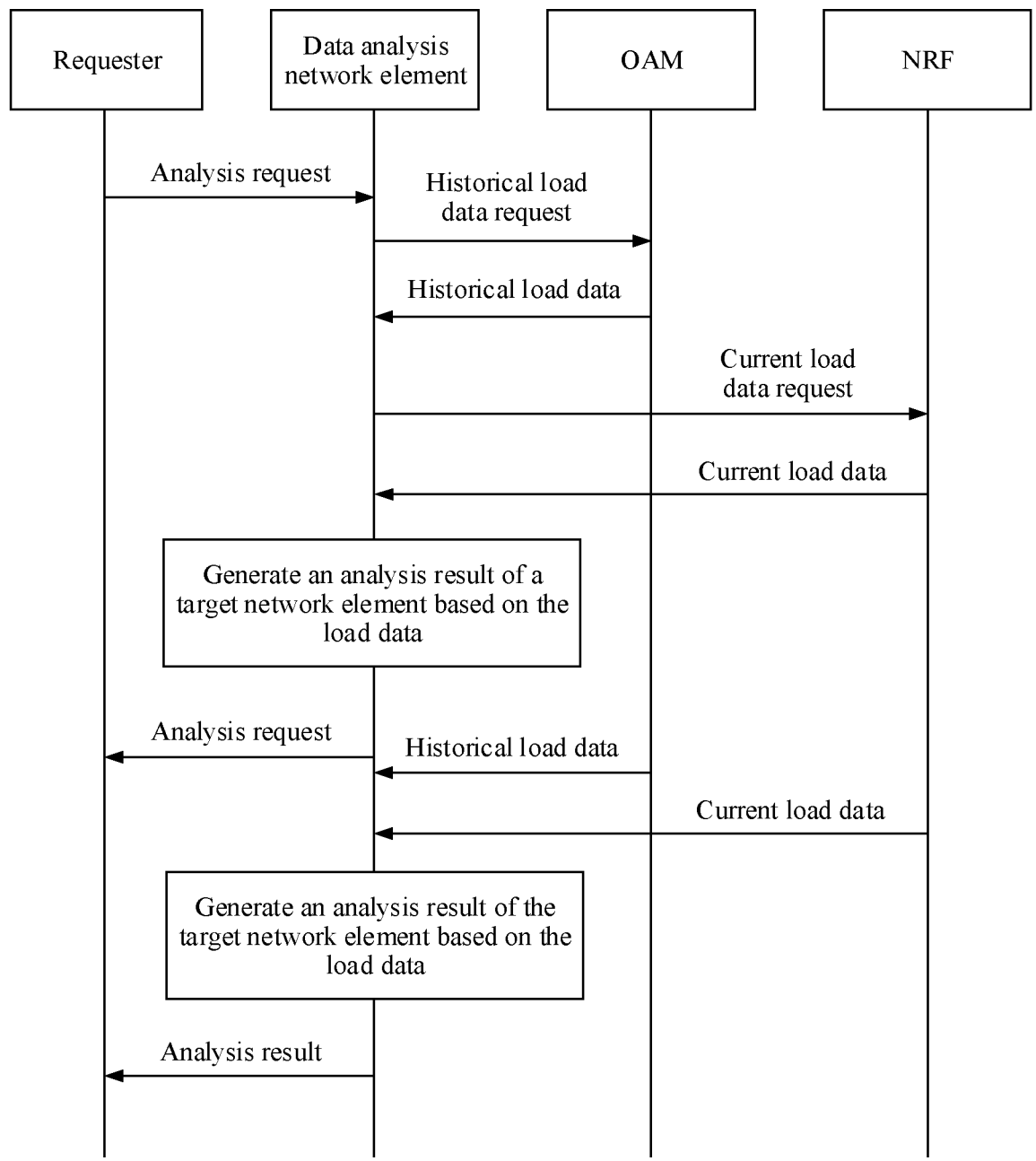
FIG. 7 is a flowchart of another data processing method according to an embodiment of this application.

For example, the data analysis network element sends a historical load data request to the OAM. The historical load data request includes the information about the target network element, or may include the information about the network slice. After receiving the historical load data request, the OAM sends the historical load data of the target network element to the data analysis network element. If the analysis request is a query-type request, the historical load data request is a query-type request, and the OAM sends the historical load data of the target network element to the data analysis network element once. Referring to FIG. 7, if the analysis request is a subscription-type request, the historical load data request is a subscription-type request. After sending the historical load data of the target network element to the data analysis network element once, each time the historical load data of the target network element changes, or according to a time interval required by the requester, after a specified time interval, the OAM sends history load data of the target network element to the data analysis network element once until the analysis request is canceled. For both the query-type historical load data request and the subscription-type historical load data request, refer to the conventional technology. Details are not described herein.

In this way, the data analysis network element may obtain the historical load data of the target network element from the OAM, for example, the service load, the upper limit of the service load, and the performance measurement data of the quality of service flow, to perform analysis based on the obtained historical load data, so as to obtain the analysis result.

Figure 8:
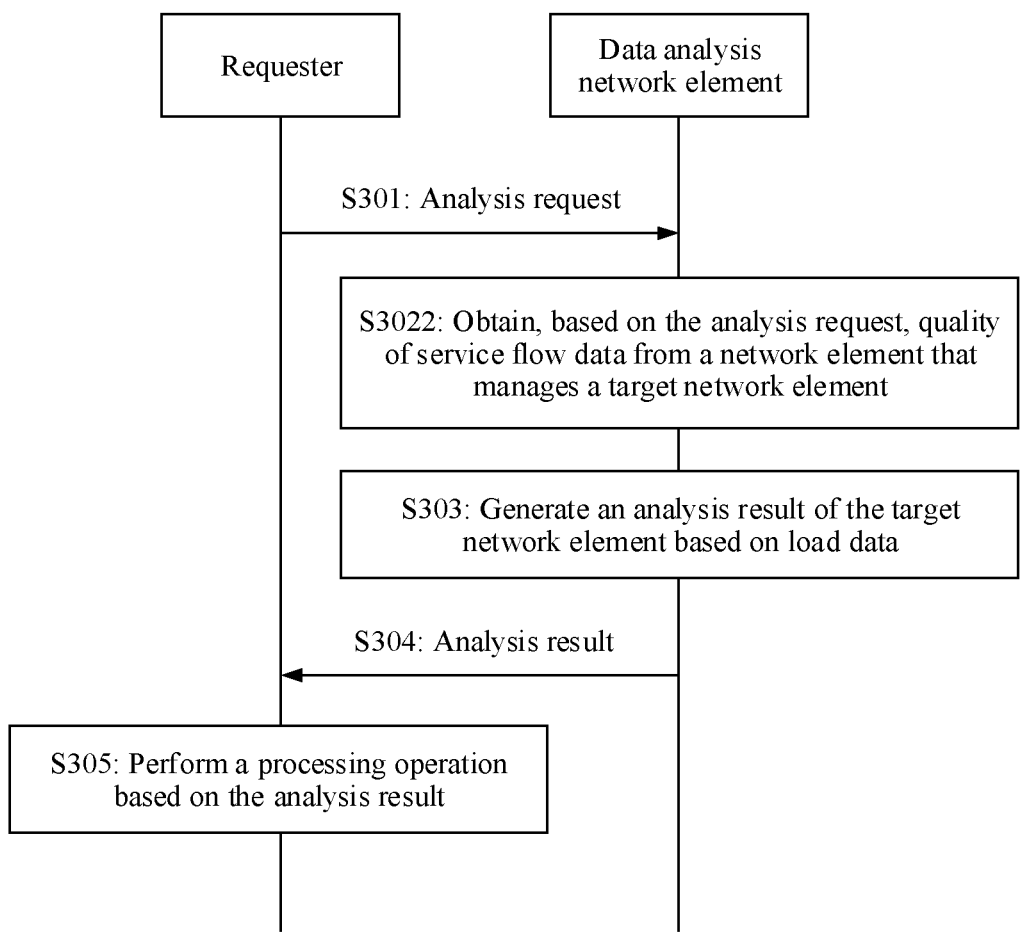
FIG. 8 is a flowchart of yet another data processing method according to an embodiment of this application.

When the load data is the historical load data, and the historical load data is the quality of service flow data, refer to FIG. 8. S302 may be specifically implemented as S3022.

S3022: The data analysis network element obtains, based on the analysis request, the quality of service flow data from a network element that manages the target network element.

Figure 9:
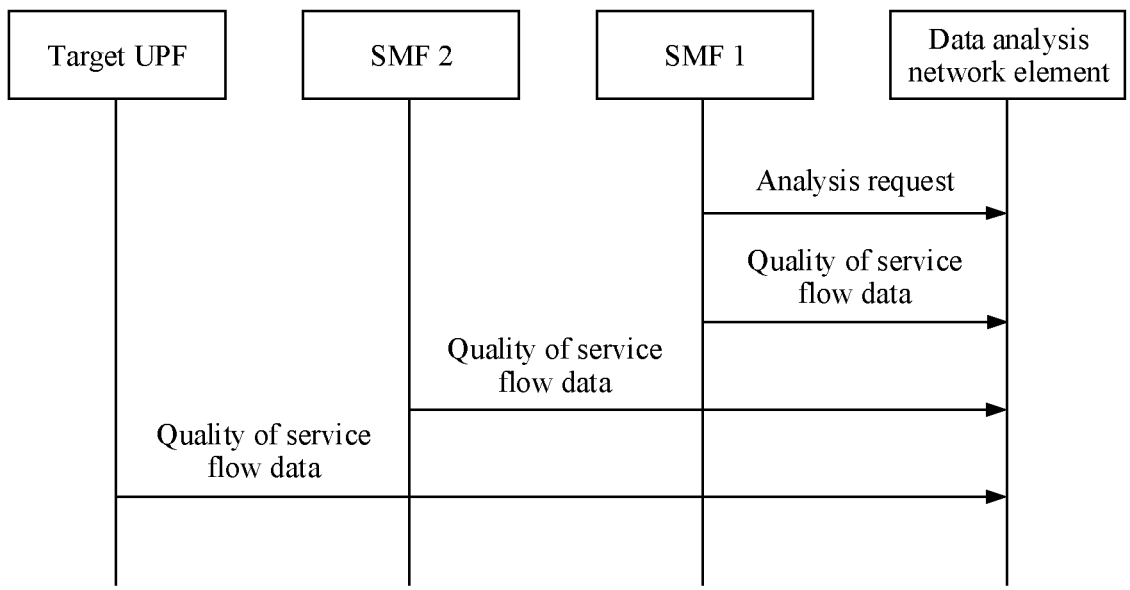
FIG. 9 is a flowchart of a method for obtaining quality of service flow data according to an embodiment of this application.

For example, referring to FIG. 9, an SMF 1 is used as a requester. In an analysis request sent by the SMF 1, the information about the target network element is an instance identifier of a target UPF. The data analysis network element collects, based on the analysis request, quality of service flow data from SMFs that manage the target UPF. For example, network elements that manage the target UPF are the SMF 1 and an SMF 2, and the data analysis network element may collect quality of service flow data of the target UPF from the SMF 1 and the SMF 2.

Figure 10:
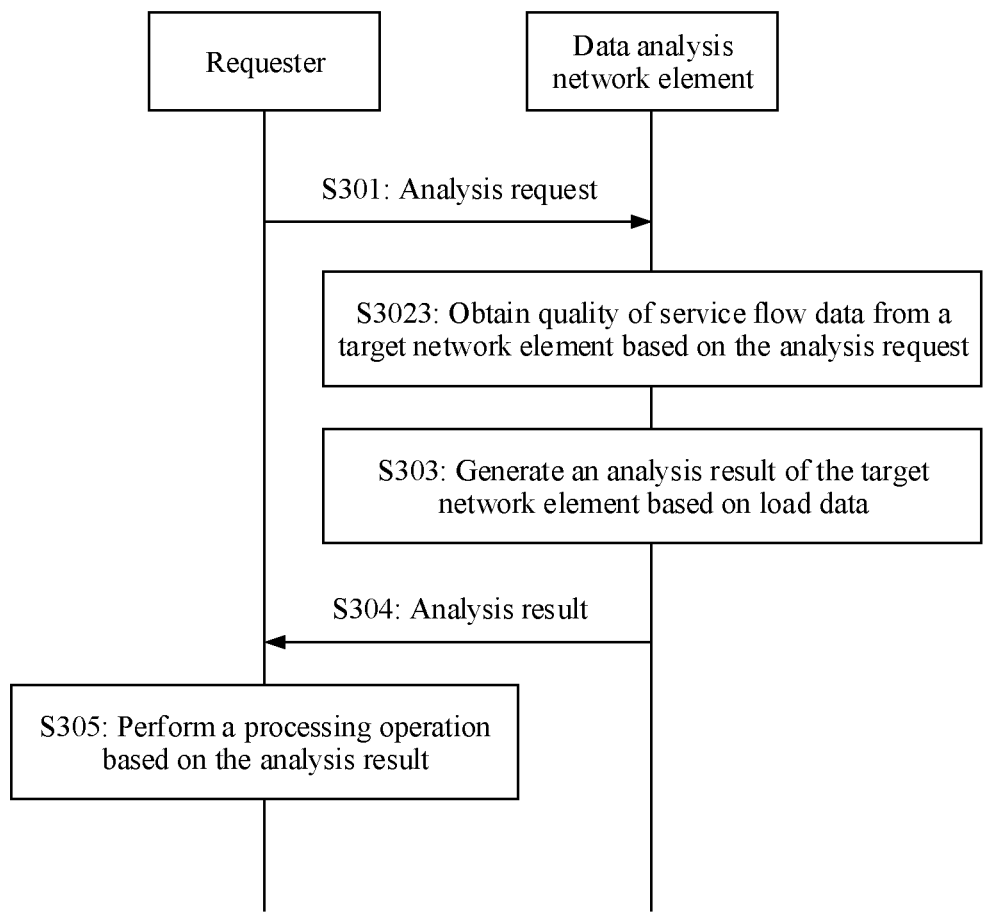
FIG. 10 is a flowchart of a data processing method according to an embodiment of this application.

When the load data is the historical load data, and the historical load data is the quality of service flow data, refer to FIG. 10. S302 may be specifically implemented as S3023.

S3023: The data analysis network element obtains the quality of service flow data from the target network element based on the analysis request.

For example, the target network element is a target UPF. Referring to FIG. 9, the data analysis network element obtains the quality of service flow data from the target UPF. For example, the data analysis network element collects the quality of service flow data through a service-based interface of the target UPF.

Figure 11:
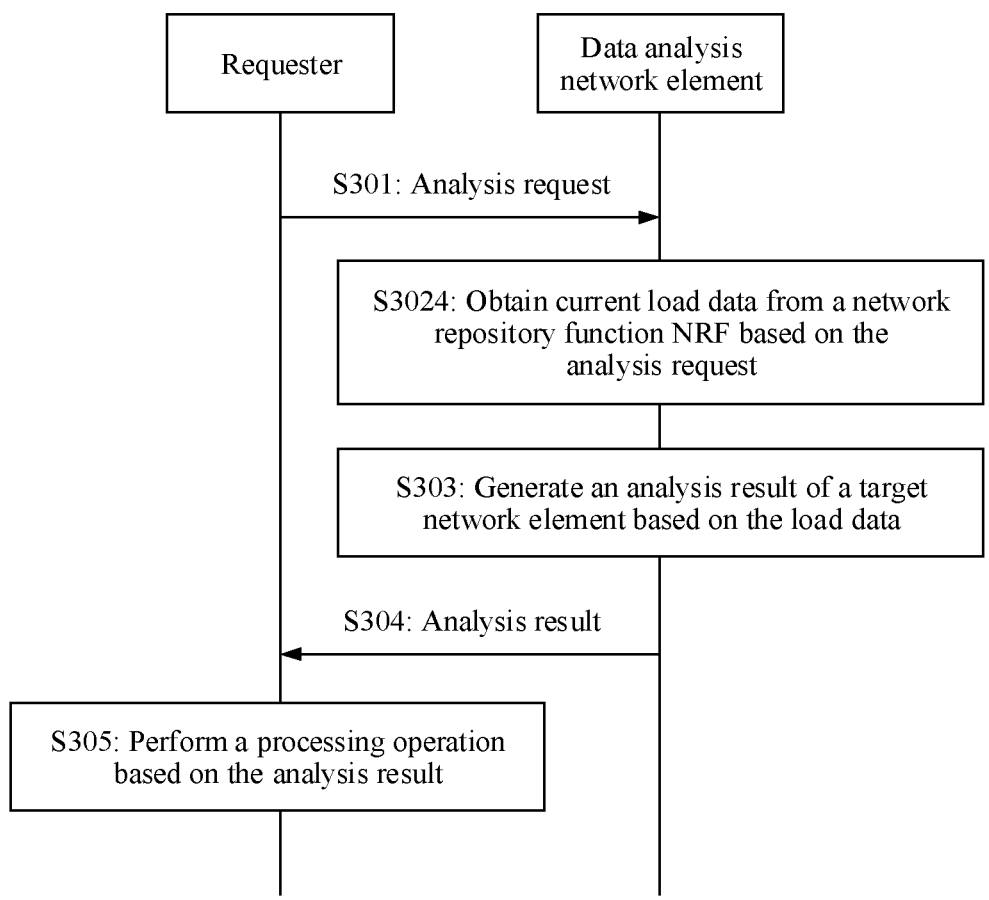
FIG. 11 is a flowchart of another data processing method according to an embodiment of this application.

When the load data is the current load data, refer to FIG. 11. S302 may be specifically implemented as S3024.

S3024: The data analysis network element obtains the current load data from a network repository function NRF based on the analysis request.

The NRF can provide current load information of the target network element.

The current load data includes at least one of the ratio of the service load or the ratio of the load that is related to the quality of service flow and that is of the target network element to the maximum service load of the quality of service flow.

For example, the data analysis network element sends a current load data request to the NRF. The current load data request includes the information about the target network element, or may include the information about the network slice. After receiving the current load data request, the NRF sends the current load data of the target network element to the data analysis network element. If the analysis request is a query-type request, the current load data request is a query-type request, and the NRF sends the current load data of the target network element to the data analysis network element once. Referring to FIG. 7, if the analysis request is a subscription-type request, the current load data request is a subscription-type request, and after sending the current load data of the target network element to the data analysis network element once, each time the current load data of the target network element changes, or based on a time interval required by the requester, after a specified time interval, the NRF sends current load data of the target network element to the data analysis network element once until the analysis request is canceled. For both the query-type current load data request and the subscription-type current load data request, refer to the conventional technology. Details are not described herein.

In this way, the data analysis network element may obtain the current load data of the target network element from the NRF, for example, the ratio of the service load and the ratio of the load that is related to the quality of service flow and that is of the target network element to the maximum service load of the quality of service flow, to perform analysis based on the obtained current load data, so as to obtain the analysis result.

S303: The data analysis network element generates the analysis result of the target network element based on the load data.

The analysis result corresponds to a type of the load data. For example, if the load data includes the service load information, the analysis result includes a load analysis result. If the load data includes the resource load information, the analysis result includes a resource analysis result.

In a first possible implementation, when the load data includes the service load information, the analysis result is the load-related analysis result. The analysis result may include at least one of the average value or the peak value of the service load information of the target network element. For example, the analysis result may include the average value of the service load information of the target network element, may include the peak value of the service load information of the target network element, or may include the average value and the peak value of the service load information of the target network element.

The average value of the service load information may be an average value of service loads.

For example, the data analysis network element can obtain service loads of the target network element at different moments. The data analysis network element determines a to-be-analyzed time period. If the time period is a historical time period, the data analysis network element calculates an average value of service loads of the target network element in the historical time period. If the time period is a future time period, the data analysis network element determines a change trend of the service loads of the target network element based on obtained data of the service loads, to predict an average value of service loads of the target network element in the future time period.

For example, the data analysis network element may further perform training, by using a regression algorithm, to obtain a regression model. The regression model may be a regression model of the target network element under different service types and different service load ratios. An independent variable of the regression model may be the quality of service flow data, may be the performance measurement data of the quality of service flow, or may be the quality of service flow data and the performance measurement data of the quality of service flow. A dependent variable of the regression model is the service load. Common regression algorithms include a linear regression algorithm, a logistic regression algorithm, a polynomial regression algorithm, and the like. The regression algorithm is not limited in this embodiment of this application. The service load can be obtained by inputting the quality of service flow data or the performance measurement data of the quality of service flow into the regression model by the data analysis network element.

The average value of the service load information may alternatively be an average value of service load ratios. For example, the data analysis network element can obtain service loads of the target network element at different moments, and divide a service load at each moment by an upper limit of the service load at the moment, to obtain a ratio of the service load at the moment. The data analysis network element determines a to-be-analyzed time period. If the time period is a historical time period, the data analysis network element calculates an average value of service load ratios of the target network element in the historical time period based on obtained data. If the time period is a future time period, the data analysis network element determines a change trend of service load ratios of the target network element based on obtained data, to predict an average value of service load ratios of the target network element in the future time period.

The peak value of the service load information may be a peak value of service loads. For example, if the data analysis network element determines a peak value of service loads in a historical time period, a maximum value of the service loads in the time period may be used as the peak value of the service loads. If the data analysis network element predicts a peak value of service loads in a future time period, the data analysis network element determines a change trend of service loads of the target network element based on obtained data of the service loads, to predict the peak value of the service loads of the target network element in the future time period.

The peak value of the service load information may be a peak value of service load ratios. For example, if the data analysis network element determines a peak value of service load ratios in a historical time period, a maximum value of the service load ratios in the time period may be used as the peak value of the service load ratios. If the data analysis network element predicts a peak value of service load ratios in a future time period, the data analysis network element determines a change trend of the service load ratios of the target network element based on obtained data of the service load ratios, to predict the peak value of the service load ratios of the target network element in the future time period.

In this way, the data analysis network element can provide the load analysis result for the requester, for example, the average value or the peak value of the service load information, so that the requester selects the network element with the relatively low load based on the load analysis result. When the analysis result is an analysis result of the target network element in the slice corresponding to the information about the network slice, because impact of different network slices on the target network element is considered in the analysis result, accuracy of the analysis result is higher. When the analysis result is an analysis result of the target network element under different service types and service load ratios, because impact of the different service types on the target network element is fully considered in the analysis result, accuracy of the analysis result is higher. Based on a more accurate analysis result, the requester selects a network element in the slice corresponding to the information about the network slice, thereby greatly reducing a network element overload risk and avoiding network flapping.

In a second possible implementation, the analysis result further includes at least one of the average value or the peak value of the resource load information of the target network element. For example, the analysis result may include the average value of the resource load information of the target network element, may include the peak value of the resource load information of the target network element, or may include the average value and the peak value of the resource load information of the target network element.

The average value of the resource load information may be an average value of resource loads. For example, the data analysis network element can obtain resource loads of the target network element at different moments and service loads of different service types. The data analysis network element determines a to-be-analyzed time period. If the time period is a historical time period, the data analysis network element calculates an average value of resource loads of the target network element in the historical time period based on obtained data of the resource loads. If the time period is a future time period, the data analysis network element calculates ratios of the service loads of the different service types, obtains, through training, a regression model between service loads at the different service load ratios and an average value of resource loads at the different service load ratios, and then determine, based on obtained data of the service loads of the different service types, obtained data of the resource loads, and obtained resource load upper limits, a change trend of the resource loads of the target network element, to predict an average value of resource loads of the target network element in the future time period.

The peak value of the resource load information may be a peak value of resource loads. For example, if the data analysis network element determines a peak value of resource loads in a historical time period, a maximum value of the resource loads in the time period may be used as the peak value of the resource loads. If the data analysis network element predicts a peak value of resource loads in a future time period, the data analysis network element calculates ratios of service loads of different service types, and obtains, through training, a regression model between service loads at different service load ratios and a peak value of resource loads at the different service load ratios. Then, the data analysis network element determines, based on obtained data of the service loads of the different service types, obtained data of the resource loads, and obtained resource load upper limits, a change trend of the peak value of the resource loads of the target network element, to predict the peak value of the resource loads of the target network element in the future time period.

In this way, the data analysis network element can provide the resource analysis result for the requester, for example, the average value or the peak value of the resource load information. When resources are insufficient, the requester can expand resources in advance to ensure service experience.

It should be noted that, if the analysis request is the subscription-type request, the data analysis network element updates the analysis result after a specified time interval based on changed data or a time interval required by the requester, until the analysis request is canceled.

S304: The data analysis network element sends the analysis result to the requester.

Accordingly, the requester receives the analysis result from the data analysis network element.

It should be noted that, if the analysis request is the subscription-type request, the data analysis network element continuously sends an updated analysis result to the requester. For example, the analysis result is carried in a subscription notification message, and the data analysis network element sends the analysis result to the requester in a manner of sending a subscription notification message, until the analysis request is canceled.

According to the data processing method provided in this embodiment of this application, the data analysis network element receives the analysis request from the requester, obtains the load data of the target network element based on the analysis request, generates the analysis result of the target network element based on the load data after obtaining the load data, and sends the analysis result to the requester. The analysis request includes the information about the target network element, and the load data includes the service load information. Compared with the conventional technology in which the data analysis network element can obtain only resource data of the target network element and provide a resource analysis result of the target network element for the requester, the analysis result cannot accurately show a load status of the target network element, and accuracy of the analysis result is poor. According to the data processing method in this embodiment of this application, the load data of the target network element can be obtained, and the load data includes the service load information. Compared with the resource data of the target network element, the load data can more accurately indicate the load status of the target network element. The analysis result obtained based on the load data can accurately present the load status of the target network element, and accuracy is high.

S305: The requester performs a processing operation based on the analysis result.

For example, the requester may select a network function based on the analysis result. When the AMF is used as the requester, the AMF selects, based on the analysis result, an SMF with a relatively low current load, to avoid SMF overload. The requester may select a network path based on the analysis result. When an SMF is used as the requester, the SMF selects a UPF and a path based on the analysis result, to establish a data connection for a terminal. The requester may adjust network resources based on the analysis result. When OAM is used as the requester, when resources are insufficient, the OAM may expand the resources in advance based on the analysis result to ensure service experience.

In this way, the requester receives the analysis result from the data analysis network element, and because the analysis result can accurately present the load status of the target network element, accuracy is high. The requester may perform the processing operation, for example, network function selection, network path selection, or network resource adjustment, based on a more accurate analysis result, thereby greatly reducing a probability that the network element is overload.

Figure 12:
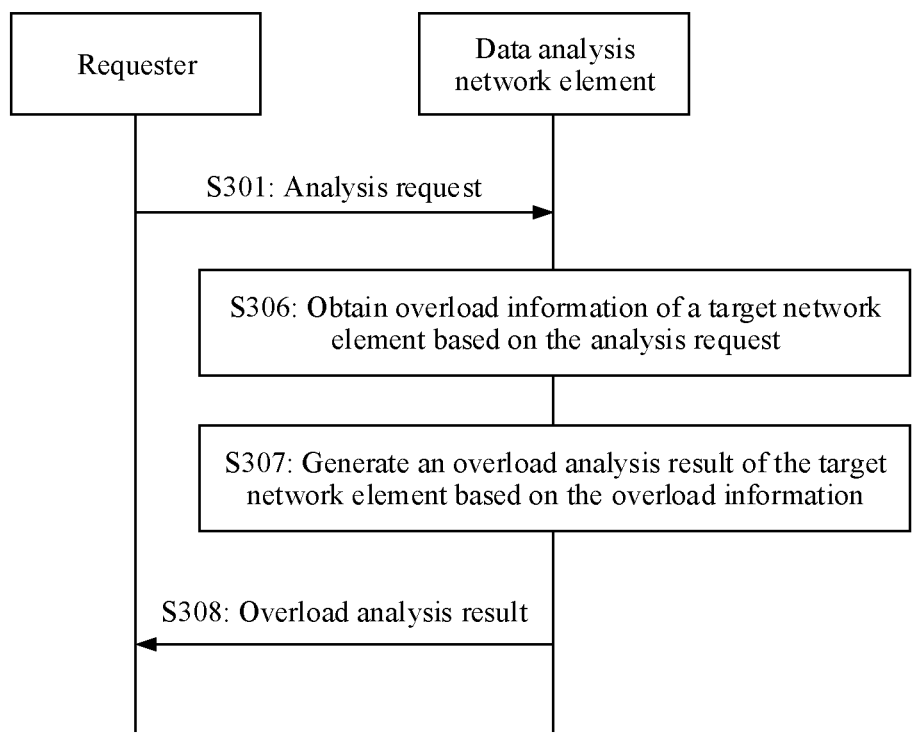
FIG. 12 is a flowchart of a method for generating an overload analysis result according to an embodiment of this application.

In addition, referring to FIG. 12, the data processing method provided in this embodiment of this application can further analyze an overload condition of the target network element. After step S301, the data processing method in this embodiment of this application further includes S306 to S308.

S306: The data analysis network element obtains overload information about the target network element based on the analysis request.

The overload information may include historical overload information, for example, overload event information and overload warning information sent by the target network element. The historical overload information may be information obtained by the data analysis network element from the OAM.

The overload information may include current overload information, for example, status information about whether the target network element is currently overloaded. The current overload information is information obtained by the data analysis network element from the NRF.

S307: The data analysis network element generates an overload analysis result of the target network element based on the overload information.

The overload analysis result may be a probability that the target network element is overloaded.

For example, the data analysis network element determines an overload time length in a to-be-analyzed time period based on each overload time in the historical overload information, and the data analysis network element determines a ratio of the overload time length to the to-be-analyzed time period as the probability that overload occurs, and stores the probability in the overload analysis result. Alternatively, the data analysis network element determines a change trend of the probability that overload occurs based on the historical overload information, to predict a probability that overload occurs in a future time period.

For example, the current overload information can record whether the target network element is overloaded. In the to-be-analyzed time period, the data analysis network element determines a total quantity of times of collecting the current overload information from the NRF and a quantity of times of overload that occurs, and determines a ratio of the quantity of times of overload that occurs to the total quantity of times of collecting the current overload information as the probability that the target network element is overloaded, and stores the probability in the overload analysis result. Alternatively, the data analysis network element determines the change trend of the probability that overload occurs based on the quantity of times of overload, to predict the probability that overload occurs in the future time period.

S308: The data analysis network element sends the overload analysis result to the requester.

Accordingly, the requester receives the overload analysis result from the data analysis network element.

In this way, the data analysis network element can further analyze the overload condition of the target network element based on the analysis request to provide the overload analysis result for the requester, so that the analysis result is more accurate and more comprehensive.

The solutions provided in the embodiments of this application are described above mainly from a perspective of interaction between different network elements. It may be understood that, to implement the foregoing functions, the data analysis network element and the network element corresponding to the requester include corresponding hardware structures and/or software modules for performing the functions. With reference to the units and algorithm steps described in the embodiments disclosed in this application, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, division into functional units may be performed on a data processing apparatus based on the foregoing example of the method. For example, functional units may be divided based on corresponding functions, or two or more than two functions may be integrated into one processing unit. The integrated unit may be implemented in a form of hardware, or may be implemented in a form of a software functional unit. It should be noted that, in the embodiments of this application, division into the units is an example, is merely logical function division, and there may be other division in an actual implementation.

Figure 13:
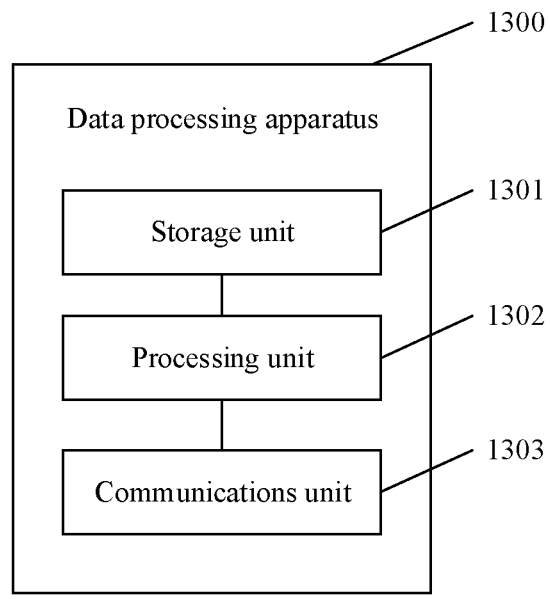
FIG. 13 is a schematic structural diagram of a data processing apparatus according to an embodiment of this application.

FIG. 13 is a schematic block diagram of a data processing apparatus according to an embodiment of this application. The data processing apparatus 1300 may exist in a form of software, a device, or a component (for example, a chip system) in a device. The data processing apparatus 1300 includes a storage unit 1301, a processing unit 1302, and a communications unit 1303.

The communications unit 1303 may be further divided into a sending unit (not shown in FIG. 13) and a receiving unit (not shown in FIG. 13). The sending unit is configured to support the data processing apparatus 1300 in sending information to another network element. The receiving unit is configured to support the data processing apparatus 1300 in receiving information from another network element.

The storage unit is configured to store program code and data of the data processing apparatus 1300. The data may include but is not limited to original data, intermediate data, or the like.

When the data processing apparatus is used as a data processing network element, the receiving unit is configured to receive an analysis request from a requester, where the analysis request includes information about a target network element, and is further configured to obtain load data of the target network element based on the analysis request, where the load data includes service load information. The processing unit is configured to generate an analysis result of the target network element based on the load data. The sending unit is configured to send the analysis result to the requester. The storage unit is configured to store the load data and the analysis result.

In a possible design, the service load information at least includes at least one of a service load, an upper limit of the service load, or a ratio of the service load.

In a possible design, the analysis result includes at least one of an average value or a peak value of the service load information of the target network element.

In a possible design, the receiving unit is further configured to obtain overload information of the target network element based on the analysis request;

the processing unit is further configured to generate an overload analysis result of the target network element based on the overload information; and the sending unit is further configured to send the overload analysis result to the requester.

In a possible design, the overload analysis result includes a probability that the target network element is overloaded.

In a possible design, the load data further includes resource load information, and the analysis result further includes at least one of an average value or a peak value of the resource load information of the target network element.

In a possible design, the analysis request further includes information about a network slice, and the load data is load data corresponding to the network slice.

In a possible design, the target network element belongs to a plurality of network slices, the target network element includes a public module, and the public module is configured to process services of the plurality of network slices; and the processing unit is further configured to obtain, based on service load information corresponding to the plurality of slices and resource load information of the public module, resource load information of the public module that belongs to the network slice corresponding to the information about the network slice.

In a possible design, the target network element further includes a plurality of dedicated modules, and the plurality of dedicated modules are configured to respectively process the services of the plurality of network slices;

the resource load information includes resource load information of a dedicated module of the network slice corresponding to the information about the network slice and the resource load information of the public module of the plurality of slices; and the processing unit is further configured to obtain, based on the resource load information of the dedicated module and the resource load information of the public module that belongs to the network slice corresponding to the information about the network slice, resource load information of the target network element that belongs to the network slice corresponding to the information about the network slice.

In a possible design, the service load information includes load data related to a quality of service flow.

In a possible design, the load data related to the quality of service flow includes one or more pieces of the following information: quality of service flow data, performance measurement data of the quality of service flow, or a ratio of a service load that is related to the quality of service flow and that is of the target network element to a maximum service load of the quality of service flow.

In a possible design, the service load information includes load data related to a quality of service flow of a service type of the target network element. The analysis result includes at least one of an average value or a peak value of the load data related to the quality of service flow of the service type of the target network element.

In a possible design, the service load information includes load data related to quality of service flows of a plurality of service types of the target network element. The analysis result includes at least one of an average value or a peak value of the service load information of the target network element under conditions of the plurality of service types and different service load ratios.

In a possible design, that the receiving unit is configured to obtain load data of the target network element based on the analysis request is specifically: obtaining historical load data from operations, administration and maintenance OAM based on the analysis request, where the historical load data includes one or more of the service load, the upper limit of the service load, or the performance measurement data of the quality of service flow.

In a possible design, that the receiving unit is configured to obtain load data of the target network element based on the analysis request is specifically: obtaining current load data from a network repository function NRF based on the analysis request, where the current load data includes at least one of the ratio of the service load or the ratio of load that is related to the quality of service flow and that is of the target network element to the maximum service load of the quality of service flow.

When the data processing apparatus is used as a requester, the sending unit is configured to send an analysis request to a data analysis network element, where the analysis request includes information about a target network element. The receiving unit is configured to receive an analysis result from the data analysis network element. The processing unit is configured to perform a processing operation based on the analysis result. The storage unit is configured to store the analysis result.

The processing unit may be a processor or a controller, for example, a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communications unit may be a communications interface, a transceiver, a transceiver circuit, or the like. The communications interface is a general name. In a specific implementation, the communications interface may include a plurality of interfaces, for example, an interface between terminals and/or another interface.

The storage unit may be a memory.

Figure 14:
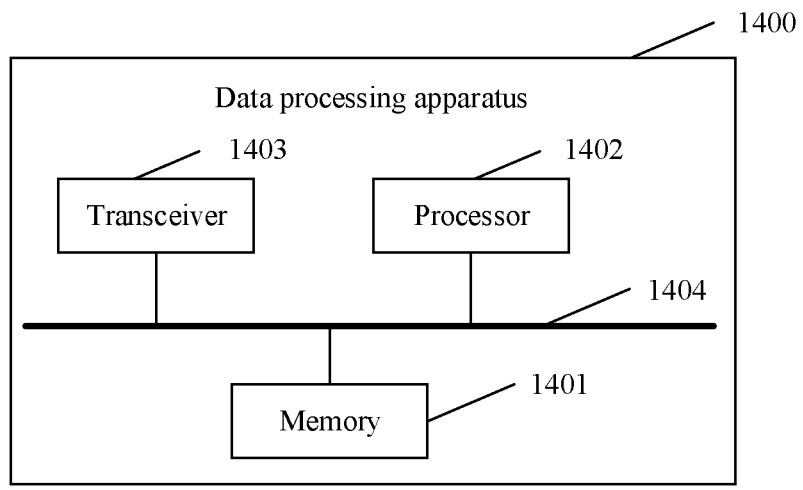
FIG. 14 is a schematic structural diagram of another data processing apparatus according to an embodiment of this application.

When the processing unit is the processor, the communications unit is the communications interface, and the storage unit is the memory, a data processing apparatus 1400 in an embodiment of this application may be shown in FIG. 14.

Referring to FIG. 14, the data processing apparatus 1400 includes a processor 1402, a transceiver 1403, and a memory 1401.

The transceiver 1403 may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in the embodiments of this application.

Optionally, the data processing apparatus 1400 may further include a bus 1404. The transceiver 1403, the processor 1402, and the memory 1401 may be connected to each other through the bus 1404. The bus 1404 may be a peripheral component interconnect (PCI) bus, an extended industry standard architecture (EISA) bus, or the like. The bus 1404 may be classified into an address bus, a data bus, a control bus, and the like. For ease of representation, only one thick line is used to represent the bus in FIG. 14, but this does not mean that there is only one bus or only one type of bus.

A person of ordinary skill in the art may understand that all or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic or other forms.

The units described as separate parts may or may not be physically separate, and parts displayed as units may or may not be physical units, may be located in one position, or may be distributed on a plurality of network devices (for example, a terminal). Some or all of the units may be selected based on actual requirements to achieve the objectives of the solutions of the embodiments.

In addition, functional units in the embodiments of this application may be integrated into one processing unit, or each of the functional units may exist independently, or two or more units are integrated into one unit. The integrated unit may be implemented in a form of hardware, or may be implemented in a form of hardware plus a software functional unit.

Based on the foregoing descriptions of the implementations, a person skilled in the art may clearly understand that this application may be implemented by software plus necessary universal hardware or by hardware only. In most circumstances, the former is a preferred implementation. Based on such an understanding, the technical solutions of this application essentially or the part contributing to the conventional technology may be implemented in a form of a software product. The computer software product is stored in a readable storage medium, for example, a floppy disk, a hard disk or an optical disc of a computer, and includes several instructions for instructing a computer device (which may be a personal computer, a server, or a network device) to perform the methods described in the embodiments of this application.

What is claimed is:

1. A method, comprising:
   receiving, by a data analysis network element, an analysis request from a requester, the analysis request comprising information about a target network element and a single network slice selection assistance information (S-NSSAI) ID or a network slice instance (NSI) ID of a network slice, the target network element belonging to a plurality of network slices and the network slice is one of the plurality of network slices;
   obtaining, by the data analysis network element, a load data of the target network element based on the analysis request, the load data comprising a service load information corresponding to the network slice, the service load information comprising load data related to a quality of service flow;
   generating, by the data analysis network element, an analysis result of the target network element based on the load data; and
   sending, by the data analysis network element, the analysis result to the requester.

2. The method according to claim 1, wherein the service load information further comprises at least one of a service load, an upper limit of the service load, or a ratio of the service load.

3. The method according to claim 1, wherein the analysis result comprises at least one of an average value or a peak value of the service load information of the target network element.

4. The method according to claim 1, wherein the load data further comprises resource load information, and the analysis result further comprises at least one of an average value or a peak value of the resource load information of the target network element.

5. The method according to claim 1, wherein the target network element comprises a public module, and the public module is configured to process services of the plurality of network slices, and
   wherein the method further comprises:
   obtaining, by the data analysis network element, based on the service load information corresponding to the plurality of slices and resource load information of the public module, resource load information of the public module that belongs to the network slice corresponding to the S-NSSAI ID or the NSI ID of the network slice.

6. The method according to claim 5, wherein the target network element further comprises a plurality of dedicated modules, and the plurality of dedicated modules are configured to process the services of the plurality of network slices,
   wherein the resource load information comprises resource load information of a dedicated module of the network slice corresponding to the S-NSSAI ID or the NSI ID of the network slice and the resource load information of the public module of the plurality of slices, and
   wherein the method further comprises:
   obtaining, by the data analysis network element based on the resource load information of the dedicated module and the resource load information of the public module that belongs to the network slice corresponding to the S-NSSAI ID or the NSI ID of the network slice, resource load information of the target network element that belongs to the network slice corresponding to the S-NSSAI ID or the NSI ID of the network slice.

7. The method according to claim 1, wherein the load data related to the quality of service flow comprises one or more of: a quality of service flow data, a performance measurement data of the quality of service flow, or a ratio of a service load that is related to the quality of service flow and that is of the target network element to a maximum service load of the quality of service flow.

8. The method according to claim 7, wherein the obtaining, by the data analysis network element, the load data of the target network element based on the analysis request comprises:
   obtaining, by the data analysis network element, historical load data from operations, administration, and maintenance (OAM) based on the analysis request, wherein the historical load data comprises one or more of the service load, an upper limit of the service load, or the performance measurement data of the quality of service flow.

9. The method according to claim 1, wherein the obtaining, by the data analysis network element, the load data of the target network element based on the analysis request comprises:
   obtaining, by the data analysis network element, current load data from a network repository function (NRF) based on the analysis request, wherein the current load data comprises at least one of the ratio of the service load or the ratio of the load that is related to the quality of service flow and that is of the target network element to the maximum service load of the quality of service flow.

10. The method according to claim 1, further comprising:
    sending, by the requester, the analysis request to the data analysis network element.

11. An apparatus, comprising:
    a memory storing instructions; and
    at least one processor in communication with the memory, the at least one processor configured, upon execution of the instructions, to perform the following steps:
    receive an analysis request from a requester, the analysis request comprising information about a target network element and a single network slice selection assistance information (S-NSSAI) ID or a network slice instance (NSI) ID of a network slice, the target network element belonging to a plurality of network slices and the network slice is one of the plurality of network slices;
    obtain a load data of the target network element based on the analysis request, the load data comprising a service load information corresponding to the network slice, the service load information comprising load data related to a quality of service flow;
    generate an analysis result of the target network element based on the load data; and
    send the analysis result to the requester.

12. The apparatus according to claim 11, wherein the service load information further comprises at least one of a service load, an upper limit of the service load, or a ratio of the service load.

13. The apparatus according to claim 11, wherein the analysis result comprises at least one of an average value or a peak value of the service load information of the target network element.

14. The apparatus according to claim 11, wherein the load data further comprises resource load information, and the analysis result further comprises at least one of an average value or a peak value of the resource load information of the target network element.

15. The apparatus according to claim 11, wherein the load data related to the quality of service flow comprises one or more of: a quality of service flow data, a performance measurement data of the quality of service flow, or a ratio of a service load that is related to the quality of service flow and that is of the target network element to a maximum service load of the quality of service flow.

16. A non-transitory computer readable storage media storing computer instructions that configure at least one processor, upon execution of the instructions, to perform the following steps:
 receive an analysis request from a requester, the analysis request comprising information about a target network element and a single network slice selection assistance information (S-NSSAI) ID or a network slice instance (NSI) ID of a network slice, the target network element belonging to a plurality of network slices and the network slice is one of the plurality of network slices;
 obtain a load data of the target network element based on the analysis request, the load data comprising a service load information corresponding to the network slice, the service load information comprising load data related to a quality of service flow;
 generate an analysis result of the target network element based on the load data; and
 send the analysis result to the requester.

17. The apparatus according to claim 15, wherein the obtaining the load data of the target network element based on the analysis request comprises:
 obtaining historical load data from operations, administration, and maintenance (OAM) based on the analysis request, wherein the historical load data comprises one or more of the service load, an upper limit of the service load, or the performance measurement data of the quality of service flow.

18. The apparatus according to claim 15, wherein the obtaining the load data of the target network element based on the analysis request comprises:
 obtaining current load data from a network repository function (NRF) based on the analysis request, wherein the current load data comprises at least one of the ratio of the service load or the ratio of the load that is related to the quality of service flow and that is of the target network element to the maximum service load of the quality of service flow.

19. The non-transitory computer readable storage media according to claim 16, wherein the service load information further comprises at least one of a service load, an upper limit of the service load, or a ratio of the service load.

20. The non-transitory computer readable storage media according to claim 16, wherein the analysis result comprises at least one of an average value or a peak value of the service load information of the target network element.

\* \* \* \* \*